United States Patent [19]

Okamoto et al.

[11] Patent Number: 5,668,606

[45] Date of Patent: Sep. 16, 1997

[54] CONTOUR RESTORATION APPARATUS

[75] Inventors: Takuji Okamoto, Sakai; Masanori Hamada, Kadoma; Kenta Sokawa, Hirakata; Kazuya Uyeda, Suita; Hideaki Yamauchi, Neyagawa, all of Japan

[73] Assignee: Matsushita Electric Industrial Co., Ltd., Osaka, Japan

[21] Appl. No.: 616,283

[22] Filed: Mar. 15, 1996

Related U.S. Application Data

[62] Division of Ser. No. 22,303, Feb. 25, 1993, Pat. No. 5,546,135.

[30] Foreign Application Priority Data

| Feb. 28, 1992 | [JP] | Japan | 4-042557 |
| May 14, 1992 | [JP] | Japan | 4-121669 |
| Aug. 12, 1992 | [JP] | Japan | 4-214875 |
| Aug. 14, 1992 | [JP] | Japan | 4-216755 |

[51] Int. Cl.⁶ .................................................. H04N 5/208
[52] U.S. Cl. .................................................. 348/625; 348/571
[58] Field of Search .................................... 348/625, 628, 348/629, 630, 631, 627, 663, 664, 665, 666, 667, 674, 571; 358/162; H04N 5/208, 5/20, 5/202, 5/21, 9/77, 9/78, 5/57

[56] References Cited

U.S. PATENT DOCUMENTS

| 4,780,623 | 10/1988 | Yagi | 327/50 |
| 4,823,194 | 4/1989 | Mishima et al. | 358/455 |
| 4,853,783 | 8/1989 | Ozaki | 348/625 |
| 4,918,528 | 4/1990 | Oohashi | 348/625 |
| 4,942,463 | 7/1990 | Hopkins | 348/26 |
| 4,994,915 | 2/1991 | Takahashi | 348/625 |
| 5,001,553 | 3/1991 | Matsuo et al. | 348/664 |
| 5,121,209 | 6/1992 | Smith et al. | 348/625 |
| 5,177,612 | 1/1993 | Nakamura et al. | 348/589 |
| 5,231,479 | 7/1993 | Owashi et al. | 348/667 |
| 5,369,446 | 11/1994 | Parker et al. | 348/625 |
| 5,412,432 | 5/1995 | Hong | 348/625 |
| 5,515,787 | 5/1996 | Park | 348/625 |

FOREIGN PATENT DOCUMENTS

| 63-14577 | 1/1988 | Japan | H04N 5/208 |
| 3241976 | 10/1991 | Japan | H04N 5/208 |
| 4369179 | 12/1992 | Japan | H04N 5/208 |
| 2124844 | 2/1984 | United Kingdom | H03K 5/12 |
| 2181320 | 4/1987 | United Kingdom | H04N 5/208 |

Primary Examiner—John K. Peng
Assistant Examiner—Chris Grant
Attorney, Agent, or Firm—McDermott, Will & Emery

[57] ABSTRACT

A contour restoration apparatus has a plurality of delay circuits connected in series. Maximum and minimum value detection circuits detect maximum and minimum values among an input video signal and output signals of the delay circuits. A mean value circuit is used to calculate a mean value of the of the maximum and minimum values. The mean value is subtracted from a delayed signal having a delay time of one-half of a delay time obtained from all the delay circuits. An adder is used to add the result of the subtraction to the delayed signal. A non-linear processing circuit processes the output of said adder and the maximum and minimum values. The non-linear circuit outputs the output signal of the adder, if the output signal of said adder is between the maximum value and the minimum value. A contour extraction circuit multiplies a signal located centrally among the input video signal, the output signals and the signals located before and after the input signal with a predetermined coefficient. An adder adds the multiplied signals. Another adder adds the result of multiplied signal and the centrally located signal. A contour amplitude circuit detects a difference between the maximum and minimum values and outputs a coefficient determined according to the difference detected. A mixer mixes the output of the non-linear processing circuit and the output of the another adder.

5 Claims, 32 Drawing Sheets

CONTOUR RESTORATION APPARATUS

This is a divisional of application Ser. No. 08/022,303, filed Feb. 25, 1993, now U.S. Pat. No. 5,546,135.

BACKGROUND OF THE INVENTION

1. Field of the Invention

The present invention relates to a contour restoration apparatus for restoring degraded contours of received images and improving the sharpness of reproduced images.

2. Description of the Related Art

In a conventional color television transmission system, the sharpness of images reproduced by the receivers is reduced because of the limited bandwidth of the transmission. For example, in the NTSC system the bandwidth of luminance signals is limited to the maximum frequency of 4.2 MHz. Therefore, even if a picture is taken by an ideal camera tube, the slope of a change in luminance levels of a built-up image from black to white or white to black at the receiver can not be increased beyond a certain value, and the contours of the image look slightly blurred.

In order to remove the blur of reproduced images, recent years have seen contour restoration apparatuses that generate the second-derivative of the received signal and add it to the received signal to achieve contour restoration.

In the following is described a prior contour restoration apparatus.

FIG. 34 shows a block diagram of the prior contour restoration apparatus. In FIG. 33, reference numeral 1 denotes an input terminal for video signals, 11 and 12 denote delay circuits that delay the signal for a predetermined period of time, 13, 14, and 15 denote multipliers, 16 and 18 denote adders, 17 denotes a gain controller that varies the contour restoration level, and 2 denotes an output terminal. FIG. 35 shows the waveforms of signals at points a to i in FIG. 34.

The operation of the contour restoration apparatus organized as above is described below with reference to FIGS. 33 and 34. First, a video signal input to the input terminal 1 is applied to the delay circuit 11 and the multiplier 13. The output signal of the delay circuit 11 is applied to the delay circuit 12, the multiplier 14, and the adder 18. The output signal of the delay circuit 12 is applied to the multiplier 15. For example, if a video signal at point a having a waveform (a) of FIG. 35 is input to the input terminal 1, then signals at points b and c output from the delay circuits 11 and 12 have respectively waveforms (b) and (c) of FIG. 34. The original input signal at point a and signals at points b and c output from the delay circuits 11 and 12 are applied to the multipliers 13, 14, and 15, respectively. If the coefficients of the multipliers 13, 14, and 15 are respectively Ka=−1, Kb=2, and Kc=−1, then signals at points d, e, and f output from the multipliers 13, 14, and 15 have respectively waveforms (d), (e), and (f) of FIG. 35. These three signals are added by the adder 16, which outputs the second derivative of the original input video signal as shown in FIG. 35 (g) at point g. The output signal of the adder 16 is applied to the gain controller 17, which adjusts the amplitude of the signal at any given gain. For example, if the gain is 2, the signal at point h output from the gain controller 17 has a waveform shown in FIG. 35 (h). The output signals of the gain controller 17 and the delay circuit 11 are added by the adder 18, which outputs a signal at point i having a waveform (i) of FIG. 35 through the output terminal 2. This output signal is the desired signal that has removed a blur of the contour.

Prior contour restoration apparatus thus improves the sharpness of contours by obtaining a signal having steep slopes in contour parts.

However, effects of contour restoration are small on gently-sloping contours, and an increased contour gradient is accompanied with an addition of undershoots and overshoots so that image sharpness is improved at the expense of unnatural black and white hems added to a contour.

SUMMARY OF THE INVENTION

The object of the present invention is therefore to provide contour restoration apparatus that restores contours by increasing contour gradients without adding excessive undershoots and overshoots.

In order to achieve the aforementioned objective, according to the present first invention, there is provided a contour restoration apparatus comprising a signal level detector that detects the maximum and minimum amplitude levels of an input video signal and an arithmetic processor that performs arithmetic processing of the input video signal and the output signals of the signal level detector.

According to the second invention, there is provided a contour restoration apparatus comprising a signal level detector that detects the maximum and minimum amplitude levels of an input video signal, an arithmetic processor that performs arithmetic processing of the input video signal and the output signals of the signal level detector, an amplitude controller that reads the output signal of the arithmetic processor, an adder that adds the input video signal and the output signal of the amplitude controller, and a nonlinear processor that reads the output signals of the signal level detector and the adder.

According to the third invention, there is provided a contour restoration apparatus comprising a signal level detector that detects the maximum and minimum amplitude levels of an input video signal, an arithmetic processor that performs arithmetic processing of the input video signal and the output signals of the signal level detector, an amplitude controller that reads the output signal of the arithmetic processor, an adder that adds the input video signal and the output signal of the amplitude controller, a nonlinear processor that reads the output signals of the signal level detector and the adder, and a location detector that reads the input video signal and the output signals of the signal level detector and detects the locations where the maximum and minimum amplitude levels are attained.

According to the fourth invention, there is provided a contour restoration apparatus comprising a signal level detector that detects the maximum and minimum amplitude levels of an input video signal, an arithmetic processor that performs arithmetic processing of the input video signal and the output signals of the signal level detector, an amplitude controller that reads the output signal of the arithmetic processor, an adder that adds the input video signal and the output signal of the amplitude controller, a nonlinear processor that reads the output signals of the signal level detector and the adder, and a contour amplitude detector that reads the output signals of the signal level detector and detects the amplitude of a contour.

According to the fifth invention, there is provided a contour restoration apparatus comprising a signal level detector that detects the maximum and minimum amplitude levels of an input video signal, an arithmetic processor that performs arithmetic processing of the input video signal and the output signals of the signal level detector, an amplitude controller that reads the output signal of the arithmetic processor, a first adder that adds the input video signal and the output signal of the amplitude controller, a nonlinear processor that reads the output signals of the signal level detector and the first adder, a contour amplitude detector that reads the output signals of the signal level detector and detects the amplitude of a contour, a contour extractor that reads the input video signal and extracts a contour restoration component, a second adder that adds the input video signal and the output signal of the contour extractor, and a mixer that mixes the output signal of the nonlinear processor with the output signal of the second adder.

According to the sixth invention, there is provided a contour restoration apparatus comprising a sampling period converter that reads a digitized input video signal having sampling period t1 and converts it to a digitized video signal having sampling period t2 and a contour restoration section that reads the converted digitized signal having sampling period t2.

According to the seventh invention, there is provided a contour restoration apparatus comprising a signal level detector that detects the maximum and minimum amplitude levels of an input video signal, a first and second contour restoration circuits that process the input video signal, and a control signal generator that generates a control signal that corresponds to the waveform of a video signal restored by the first contour restoration circuit based on the output signals of the signal level detector and the first contour restoration circuit.

According to the eighth invention, there is provided a contour restoration apparatus comprising a signal level detector that detects the maximum and minimum amplitude levels of an input video signal, a first and second contour restoration circuits that process the input video signal, a control signal generator that generates a control signal that corresponds to the waveform of a video signal restored by the first contour restoration circuit based on the output signals of the signal level detector and the first contour restoration circuit, a contour amplitude detector that reads the output signals of the signal level detector and detects the amplitude of a contour, and a switching circuit that reads the input video signal and the output signal of the second contour restoration circuit.

According to the ninth invention, there is provided a contour restoration apparatus comprising a signal level detector that detects the maximum and minimum amplitude levels of an input video signal, a mean value circuit that reads the output signals of the signal level detector, and a switching circuit that reads the input video signal and the output signals of the signal level detector and the mean value circuit.

The contour restoration apparatus of the first invention provides sufficient effects on contour restoration for gently-sloping contours.

The contour restoration apparatus of the second invention does not add undershoots or overshoots to its restored contour so that, in addition to the effects of the apparatus of the first invention, contour restoration is achieved without adding unnatural black and white hems to a contour.

The contour restoration apparatus of the third invention does not perform contour restoration, if the maximum value and the minimum value of the amplitude of the input video signal are attained at unique points in the same direction from a pixel under consideration, so that, in addition to the effects of the apparatus of the second invention, the geometric structure of the original image is not lost.

The contour restoration apparatus of the fourth invention sets the restoration amount at low levels for areas in which contour amplitude is large so that, in addition to the effects of the apparatus of the second invention, distortions that occur in oblique contours are suppressed.

The contour restoration apparatus of the fifth invention outputs restored contour signals with high frequency enhancement for areas in which contour amplitude is large so that, in addition to the effects of the apparatus of the second invention, distortions that occur in oblique contours are suppressed, and effects on contour restoration are also obtained.

The contour restoration apparatus of the sixth invention performs contour restoration after converting the sampling period of the digitized input signal so that, in addition to the effects of the apparatus of the second invention, distortions that occur in oblique contours are suppressed.

The contour restoration apparatus of the seventh invention adjusts the amplitude of a restored contour signal at any given gain, if an undershoot or overshoot is detected by the control signal generator, so that high-slope contours are obtained without adding excessive undershoots or overshoots, and unnaturalness in contours of an image are reduced.

The contour restoration apparatus of the eighth invention does not perform contour restoration for areas in which contour amplitude is small so that, in addition to the effects of the apparatus of the seventh invention, noise and the like are not enhanced.

According to the contour apparatus of the ninth invention, a steep slope of a contour is obtained without adding undershoots or overshoots, and contour restoration is achieved without adding unnatural black and white hems to a contour.

BRIEF DESCRIPTION OF THE DRAWINGS

These and other objects and features of the present inventions will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

Figure 1:
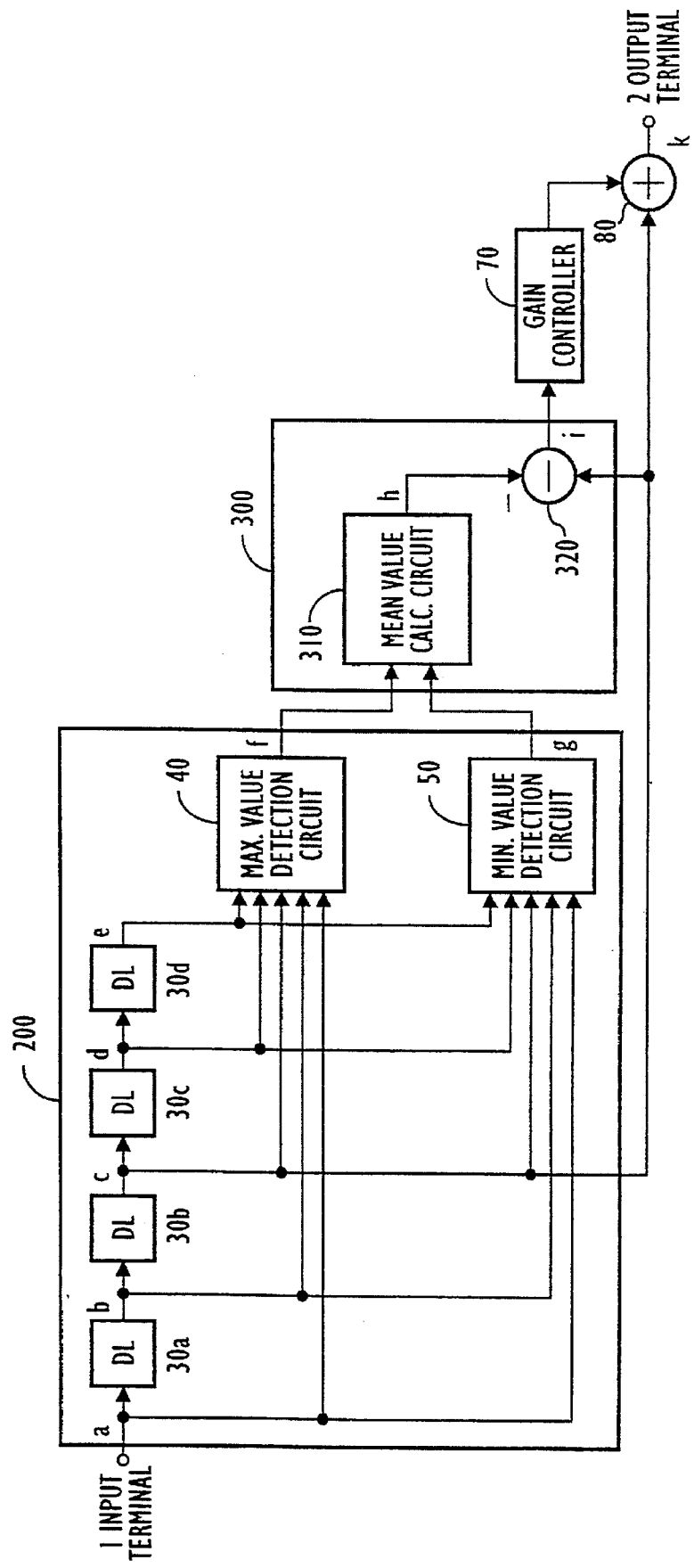
FIG. 1 shows a block diagram of the contour restoration apparatus according to the first preferred embodiment of the present invention.

The preferred embodiments according to the present inventions will be described below with reference to the attached drawings wherein same reference numerals denote same elements all through the preferred embodiment.

First Preferred Embodiment

FIG. 1 shows a block diagram of the contour restoration apparatus according to the first embodiment of the present invention. In FIG. 1, a reference numeral 1 denotes an input terminal for video signals, 200 denotes a signal level detection circuit, 300 denotes an arithmetic processing circuit, 70 denotes a gain controller, 80 denotes an adder, and 2 denotes an output terminal.

The signal level detection circuit 200 comprises four delay circuits 30a, 30b, 30c and 30d which are connected in series to the input terminal 1, a maximum value detection circuit 40 for detecting a maximum value among five signals at points a to e and a minimum value detection circuit 50 for detecting a minimum value among those five signs. Each delay circuit delays an input signal for a predetermined delay time set, for example, to the period of one pixel.

The arithmetic processing circuit comprises a mean value circuit 310 for calculating a mean value from outputs of the maximum and minimum detection circuits 40 and 50 and a subtractor 320 for subtracting the mean value obtained by the mean value circuit 310 from the video signal c delayed by two delay circuits 30a and 30b.

The operation of the contour restoration apparatus organized as above is described below. First, a video signal applied to the input terminal 1 is applied to the signal level detection circuit 200. The input video signal applied to the signal level detection circuit 200 is delayed by the delay circuits 30a, 30b, 30c, and 30d, sequentially, and the input video signal and the output signals of all the delay circuits are input to the maximum value detection circuit 40 and minimum value detection circuit 50, respectively. The output signals of the maximum value detector 40, minimum value detector 50, and delay circuit 30b are applied to the arithmetic processing circuit 300, where the output signals of the maximum value detector 40 and minimum value detector 50 are input to the mean value circuit 310, which outputs their mean value. The output signal of the mean value circuit 310 is input to one of the input terminals of the subtractor 320, and the output signal of the delay circuit 30b is input to the other input terminal of the subtractor 320. The output signal of the subtractor 320 is input to the gain controller 70. The output signal gain controlled by the gain controller 70 is provided to one of the input terminals of the adder 80, and the output signal of delay circuit 30b is provided to the other input terminal of the adder 80. The added output signal of the adder 80 is output through the output terminal 2 as a video signal having a restored contour.

Figure 2:
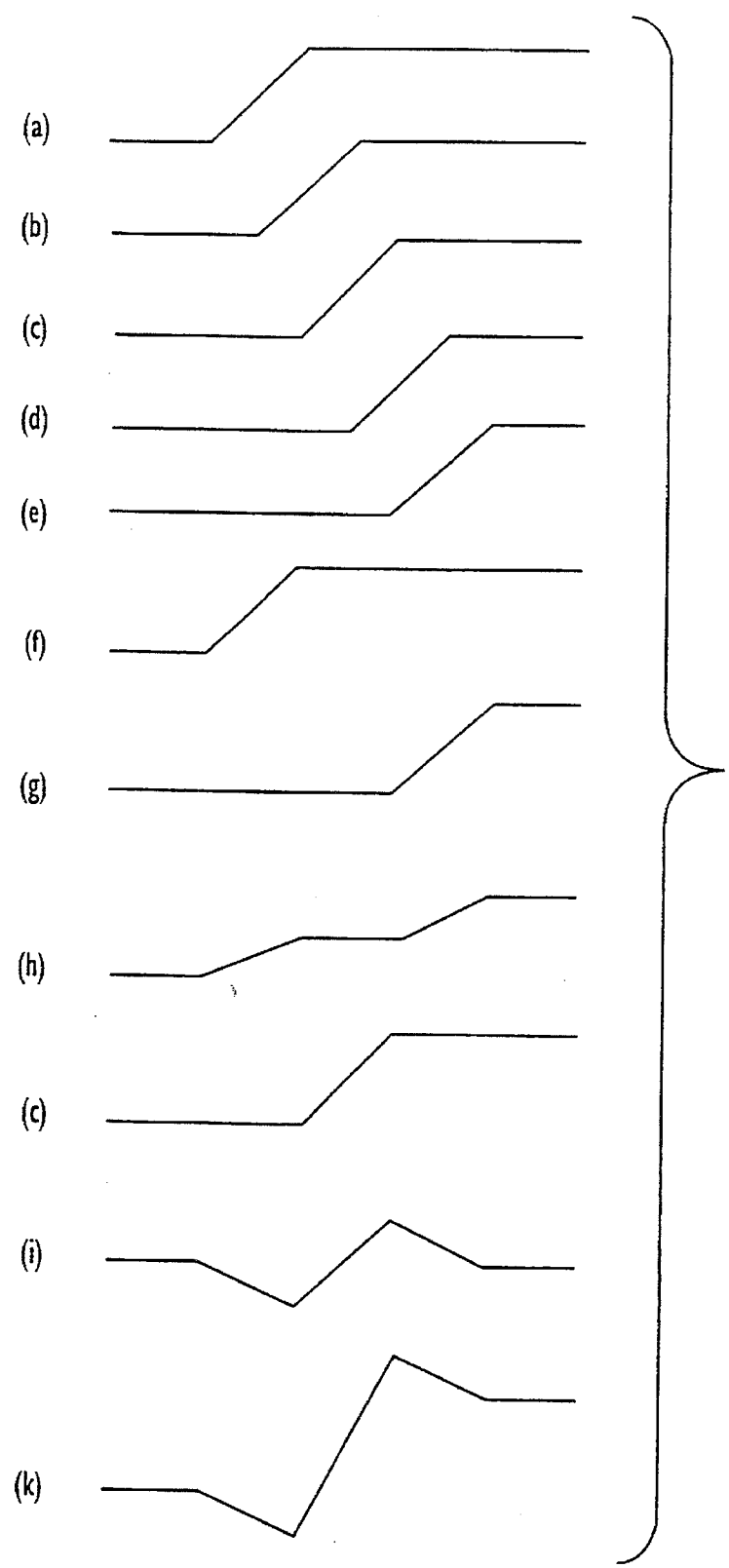
FIG. 2 shows the waveforms of signals at points a to k indicated in FIG. 1.

The operation of the contour restoration apparatus is described below in detail with reference to FIG. 2. First, if a video signal shown in (a) of FIG. 2 is applied to the input terminal 1, then the video signal is input to the signal level detection circuit 200 and delayed one by one by the delay circuits 30a, 30b, 30c and 30d, as shown in (b), (c), (d) and (e) of FIG. 2, respectively. The maximum value detection circuit 40 detects the maximum value among signals at points a, b, c, d and e of FIG. 1, and outputs a signal shown in (f) of FIG. 2 at point f. Similarly, the minimum value detection circuit 50 detects the minimum value among signals at points a, b, c, d and e, and outputs the signal shown in (g) of FIG. 2 at point g. Signals at points f and g are input to the arithmetic processing circuit 300, in which the mean value circuit 310 obtains a mean value of these signals and outputs a signal shown in (h) of FIG. 2. The subtractor 320 subtracts the signal at point h from the signal at point c and outputs a signal shown in (i) of FIG. 2 at point i. The amplitude of this output signal is adjusted at any given gain by the gain controller 70, and added to the signal at point c by the adder 80. For example, if the gain of the gain controller 70 is set at 1, then the signal shown in (k) of FIG. 2 is obtained at point k and output through the output terminal 2 as a video signal having a restored contour.

Figure 3A:
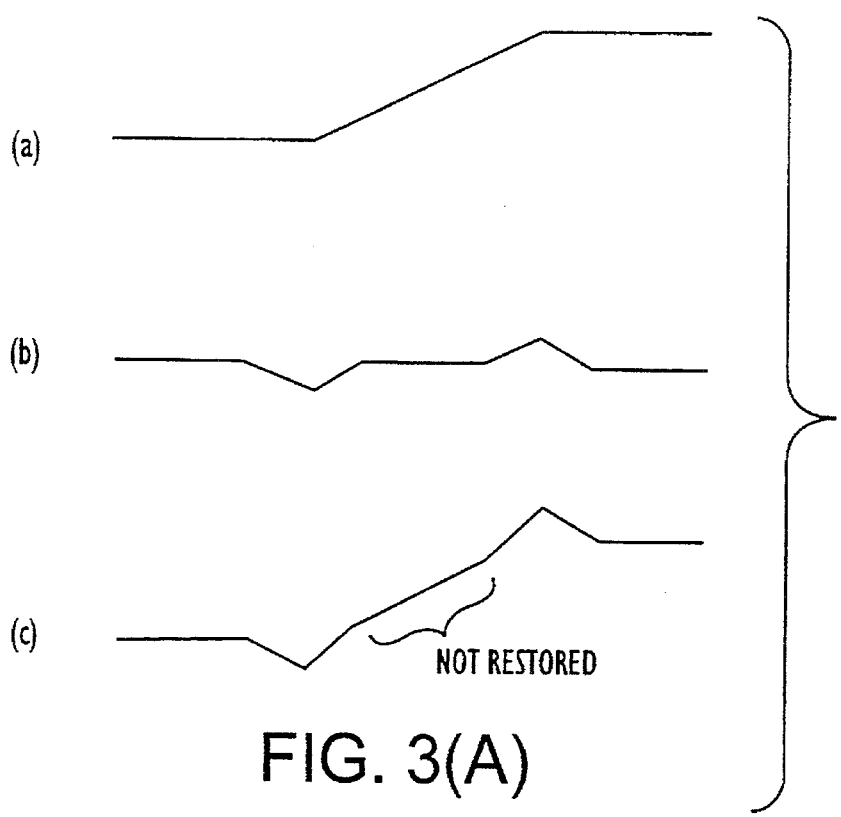
FIG. 3(A) shows waveforms which represent a contour restoration effect according to the prior art shown in FIG. 33.
Figure 3B:
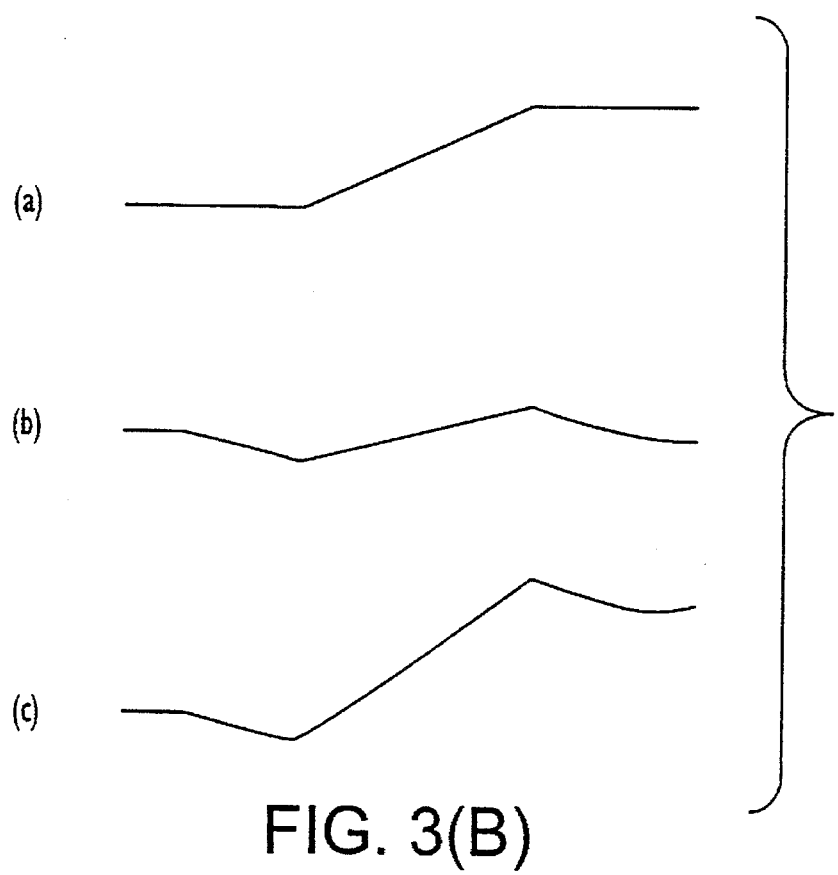
FIG. 3(B) shows waveforms which represent a contour restoration effect according to the first embodiment.

FIG. 3 shows a comparison of a contour restoration effect of the present embodiment (FIG. 3(B)) on a gently-sloping contour with that of the prior contour restoration apparatus (FIG. 3(A)). In both FIG. 3(A) and FIG. 3(B), a contour-restored signal (c) is obtained by adding a restoration signal (b) to an input video signal (a). Here the gain of restoration signals is 1 in both restoration systems. If we compare restored signals (c) of FIG. 3(A) and (c) of FIG. 3(B), we find no effect of contour restoration in the middle of the contour of (c) of FIG. 3(A) compared with (a) of FIG. 3(A), whereas we find clearly a substantial effect in the middle of contour in (c) of FIG. 3(B) compared with (a) of FIG. 3(B).

As described above, according to the first embodiment, an input video signal is restored using a restoration signal obtained by detecting the maximum and minimum amplitude levels of the input video signal in the signal level detection circuit 200 and processing the detected signals and the input video signal in the arithmetic processing circuit 300, so that a sufficient effect of contour restoration is obtained even on a gently-sloping contour.

Second Preferred Embodiment

Figure 4:
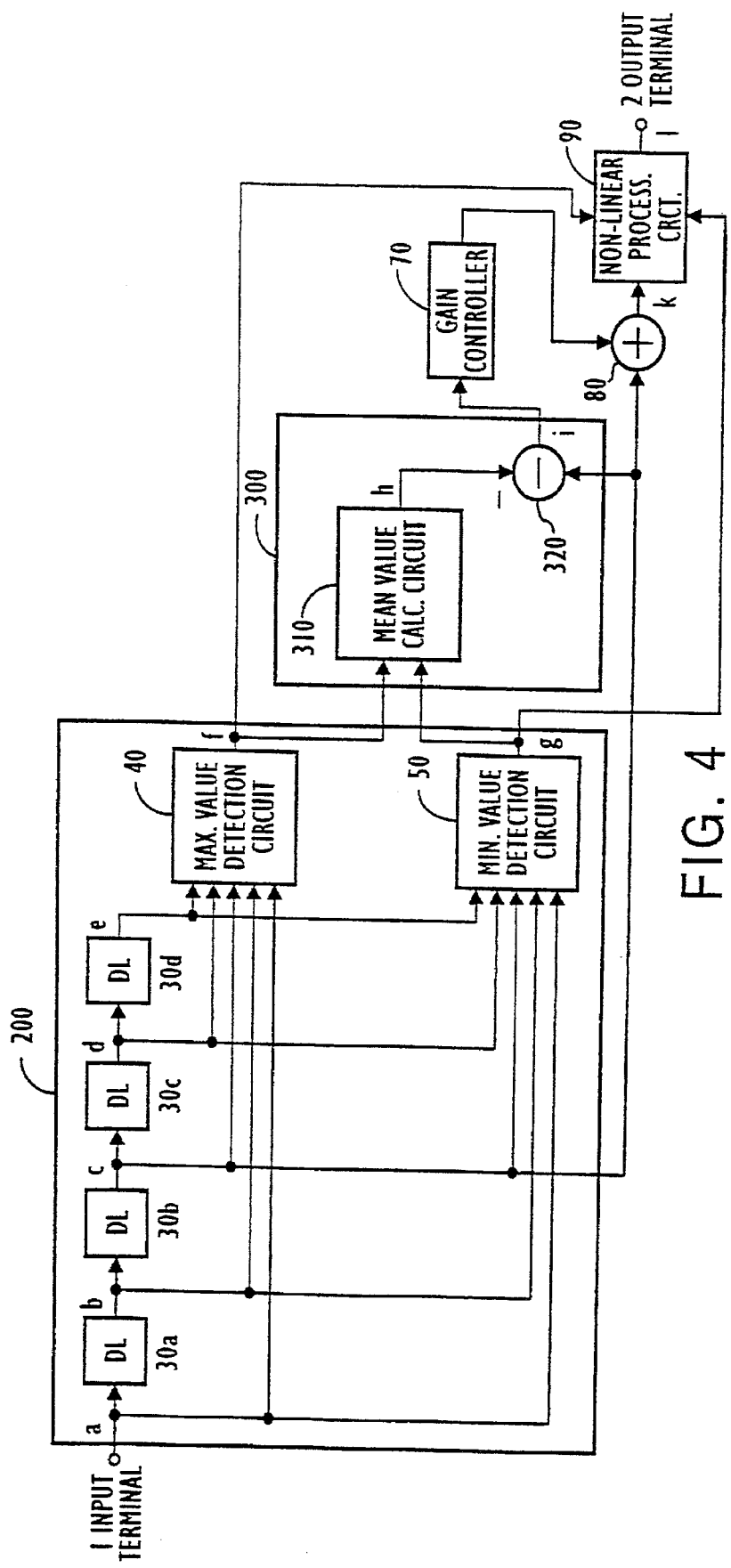
FIG. 4 shows a block diagram of the contour restoration apparatus of the second preferred embodiment according to the present invention.

FIG. 4 shows a block diagram of the contour restoration apparatus according to the second preferred embodiment of the present invention. This embodiment is the same as the first embodiment except an additional nonlinear processing circuit 90 that reads an output signal of the adder 80 and adjusts it with output signals of the maximum value detection circuit 40 and the minimum value detection circuit 50.

Figure 5:
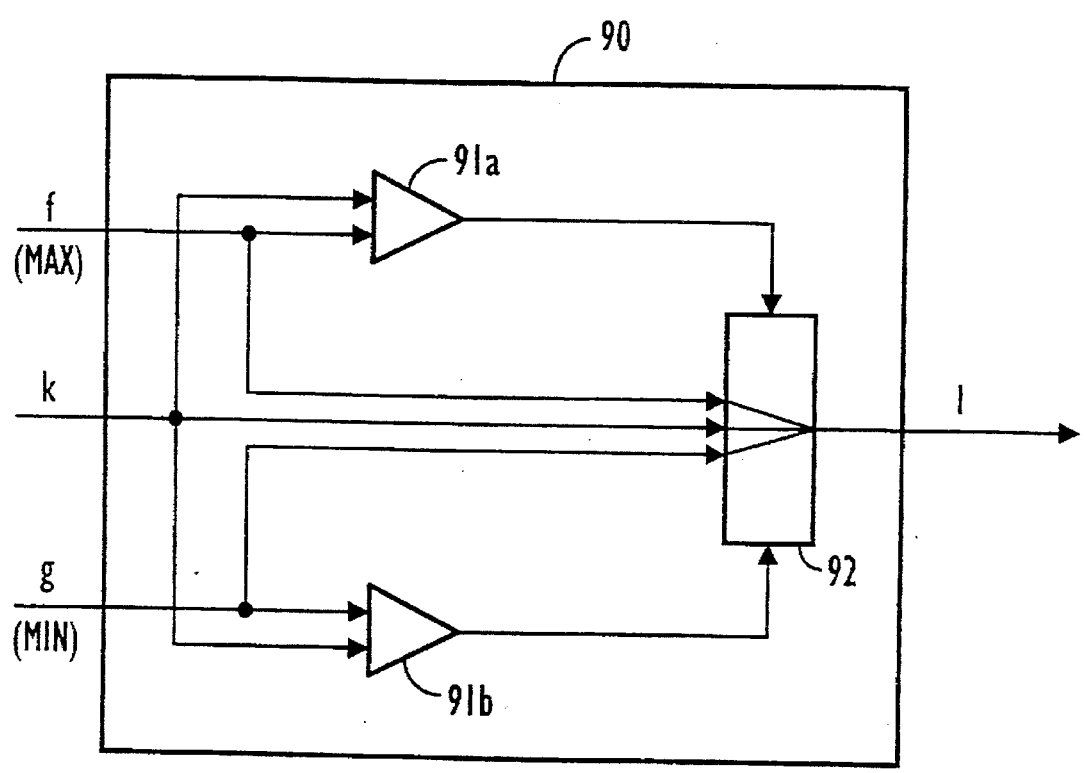
FIG. 5 shows a composition of the non-linear processing circuit shown in FIG. 4.

FIG. 5 shows a composition of the non-linear processing circuit 90 employed in the second preferred embodiment. This non-linear processing circuit 90 is comprised of first and second comparators 91a and 91b and a selector 92. The first comparator 91a compares the output signal k of the adder 80 with the output signal f of the maximum value detection circuit 40 and the second one 91b compares the same with the output signal g of the minimum value detection circuit 50. The selector 92 selects either one of three output signals f, k and g in accordance with control signals output from the first and second comparators 91a and 91b.

Figure 6:
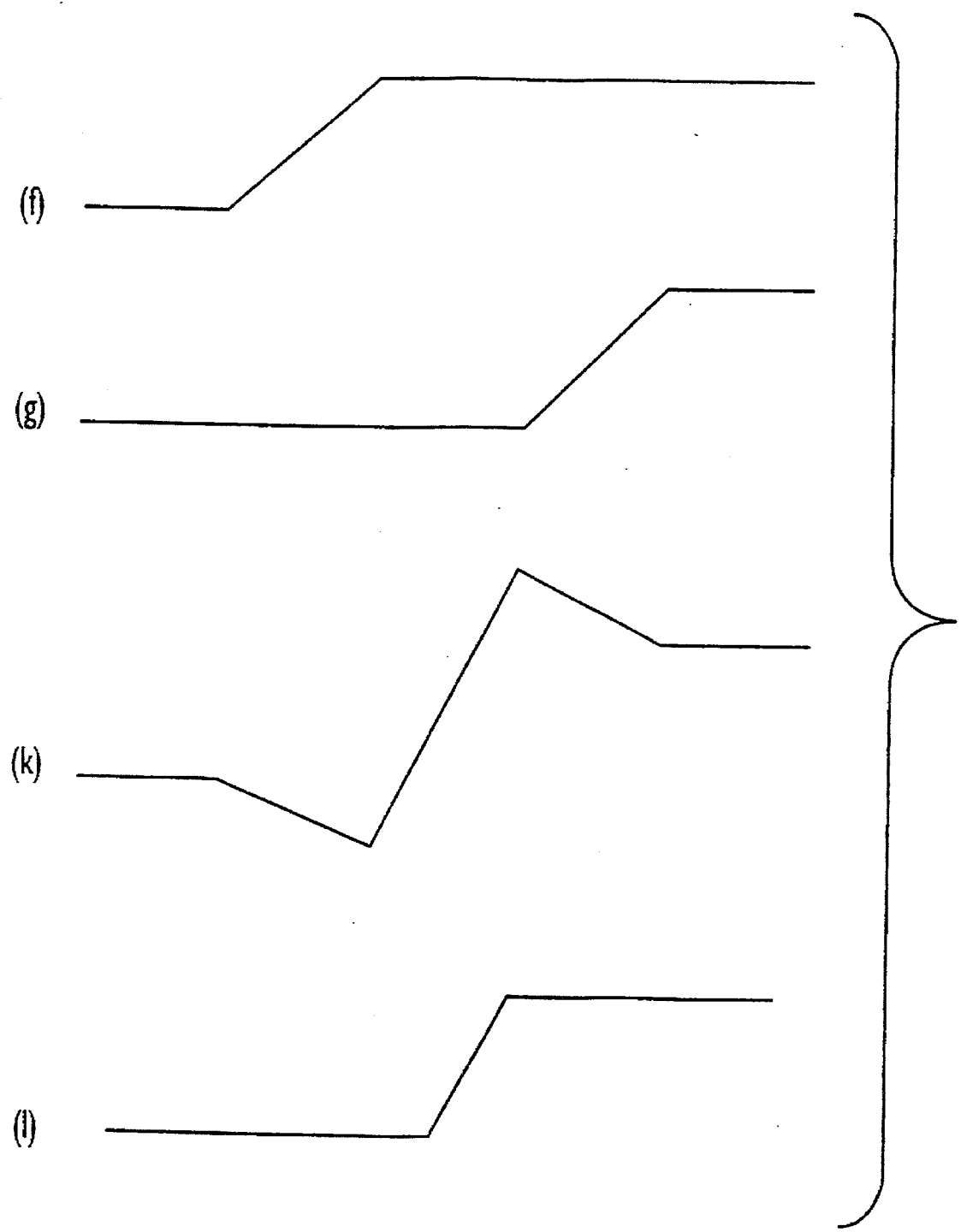
FIG. 6 shows waveforms of signals at points f to shown in FIG. 6.

The contour restoration apparatus organized as above is described below with reference to FIG. 6. The detailed operation is the same as of the first embodiment shown in FIG. 1, until the output signal ((k) of FIG. 5) of the adder 80 is obtained at point k. The output signal of the adder 80 is input to the nonlinear processing circuit 90, which also reads signals at points f and g ((f) and (g) of FIG. 6) as control signals. With these control signals the nonlinear processing circuit 90 performs nonlinear processing of the signal at point k. For example, if a level of the signal at point k is greater than the corresponding level of the signal at point f, then the signal level at point f is output, and if a level of the signal at point k is less than the corresponding level of the signal at point g, then the signal level at point g is output, and the signal level at point k is output in the other case. Then a video signal having a restored contour is obtained at point 1 as shown in (1) of FIG. 6 and output through the output terminal 2.

Thus an embodiment according to the second invention provides a sufficient restoration effect on a gently-sloping contour and also does not add undershoots or overshoots so that unnatural black and white hems do not appear on contours. The method of restoring contours described above will hereafter be referred to as a contour gradient restoration type.

Third Preferred Embodiment

Figure 7:
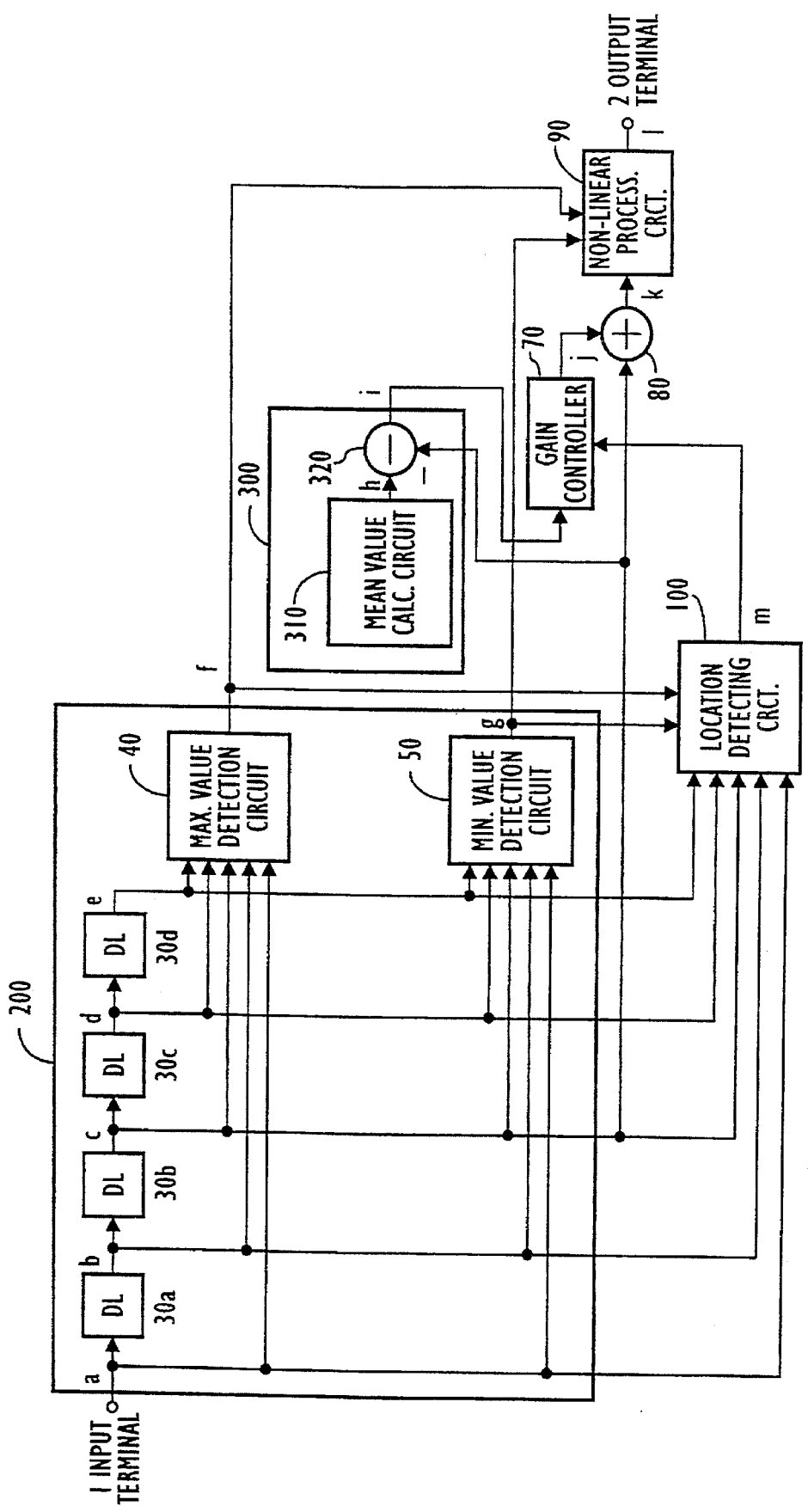
FIG. 7 shows a block diagram of the contour restoration apparatus according to the third preferred embodiment of the present invention.

FIG. 7 shows a block diagram of a contour restoration apparatus according to the third embodiment of the present invention. This embodiment is the same as an embodiment according to the second invention except an additional location detection circuit 100 which detects locations where the maximum and minimum amplitude levels are attained. To the location detection circuit 100, the input video signal and the output signals of delay circuits 30a, 30b, 30c and 30d, maximum value detector 40, and minimum detector 50 are input. The output signal of the location detection circuit 100 is input to the gain controller 70.

Figure 8:
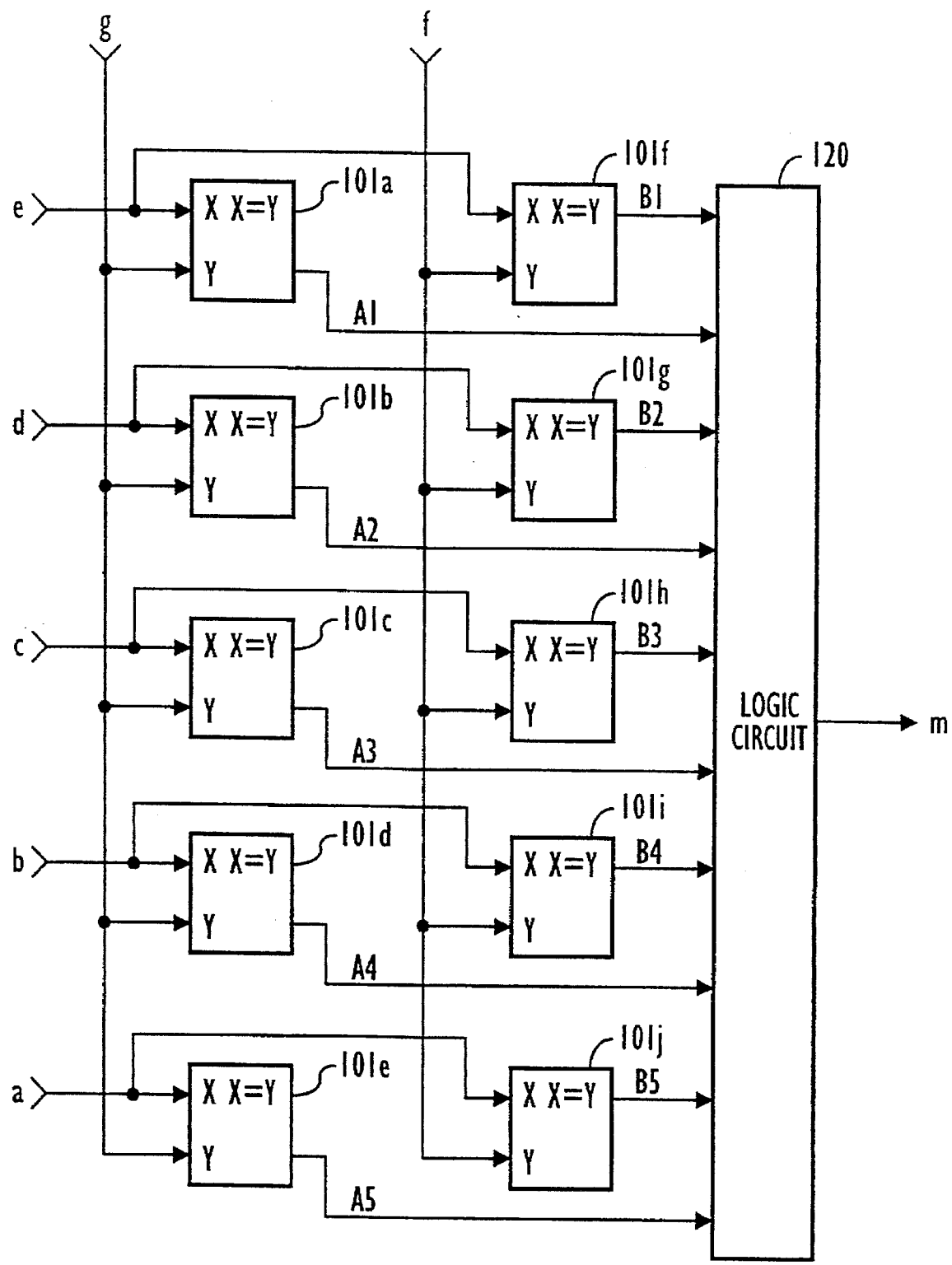
FIG. 8 shows a block diagram of the location detection circuit shown in FIG. 7.

The location detection circuit 100 is constructed, for example, as shown in FIG. 8. In FIG. 8, reference numerals 101a, 101b, 101c, 101d, 101e, 101f, 101g, 101h, 101i, and 101j denote comparators, and 120 denotes a logic circuit. First, comparators 101a to 101e compare respectively signals (a) to (e) of FIG. 9 with the output signal (g) of the minimum value detection circuit 50. Each comparator outputs a logical value 1, if the compared signals are equal; otherwise another logical value 0 is output. The output values of the comparators 101a to 101e are applied to the logic circuit 120 as A1 to A5, respectively. Similarly, comparators 101f to 101j compare signals (a) to (e) with the output signal (f) of the maximum value detection circuit 40, respectively, and output logical results to the logic circuit 120 as B1 to B5, respectively. The logic circuit 120 outputs a logical value 0, if one of the eight combinations shown in Table 1 is satisfied; otherwise the logical value 1 is output.

Figure 9:
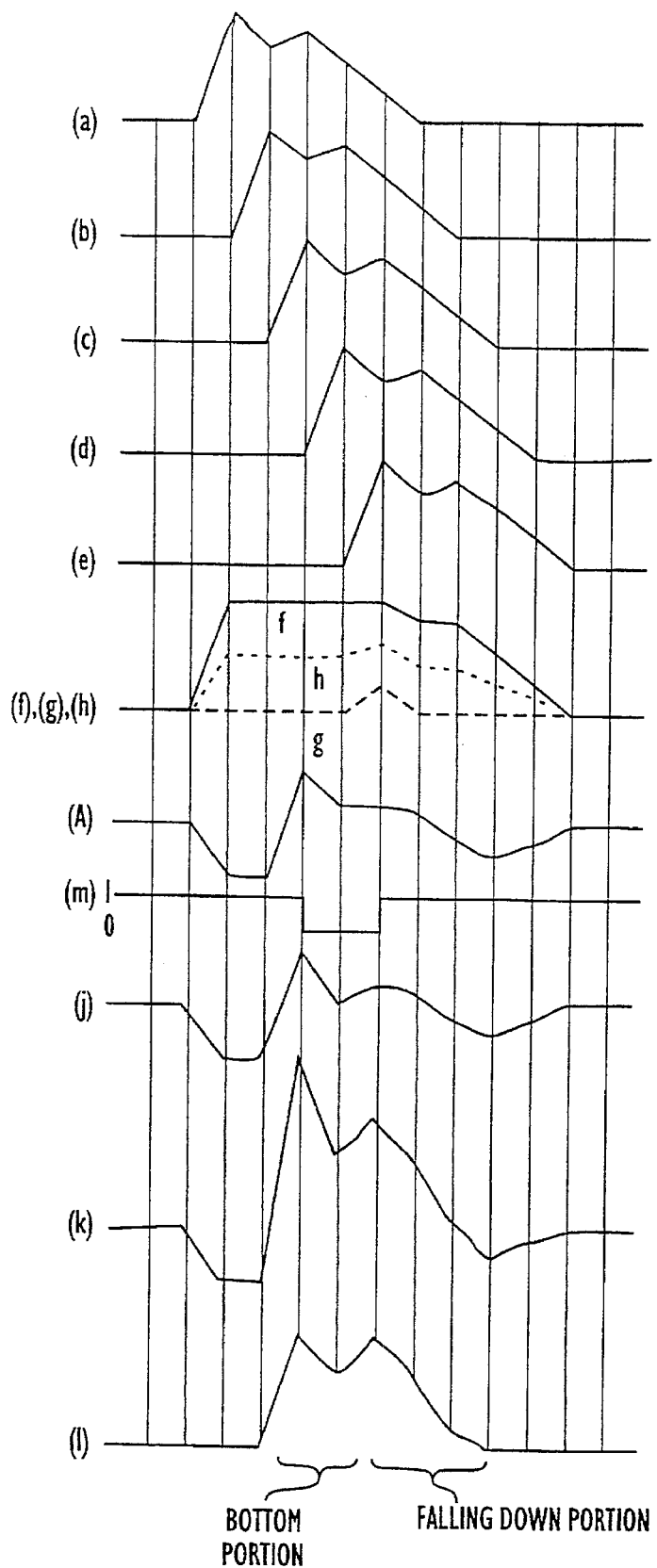
FIG. 9 shows waveforms of signals at points a to shown in FIG. 7.

The operation of the contour restoration apparatus organized as above is described below with reference to FIG. 9. First, for example, if a hill-shaped video signal as shown in (a) of FIG. 9 is input to the input terminal 1, then signals at points a to e have respectively waveforms (a) to (e) in FIG. 9. The output signals of the maximum value detection circuit 40 and minimum value detection circuit 56 have respectively waveforms (f) and (g) of FIG. 9. Therefore, a signal having waveform (h) of FIG. 9 is obtained as an output from the mean value circuit 310, and a signal having waveform (i) of FIG. 9 is obtained as an output from the subtractor 320. The operation so far is the same as of the first embodiment. Here, the input video signal (a), signals (b) to (e) output from the delay circuits 30a, 30b, 30c, 30d, and the output signals (f) and (g) of maximum value detection circuit 40 and minimum value detection circuit (50) are input to the location detection circuit 100.

The location detection circuit 100 outputs a logical value in according with a combination of input signals with reference Table 1.

In Table 1, first to fourth combinations indicate the maximum value and the minimum value are detected at point a or b locating before point c as a point under consideration and fifth to eighth combinations indicate the maximum and the minimum values are detected at point d or e locating after point c. If either one of these eight combinations is satisfied, the logic circuit 120 outputs a logical value 0 which indicates a false contour restoration and, accordingly, the contour restoration is cancelled.

TABLE 1

| Combi-<br>nation | A1<br>B1 | A2<br>B2 | A3<br>B3 | A4<br>B4 | A5<br>B5 |
|---|---|---|---|---|---|
| 1 | 0 | 1 | 0 | 0 | 0 |
|   | 0 | 1 | 0 | 0 | 0 |
| 2 | 0 | 1 | 0 | 0 | 0 |
|   | 1 | 0 | 0 | 0 | 0 |
| 3 | 1 | 0 | 0 | 0 | 0 |
|   | 0 | 1 | 0 | 0 | 0 |
| 4 | 1 | 0 | 0 | 0 | 0 |
|   | 1 | 0 | 0 | 0 | 0 |
| 5 | 0 | 0 | 0 | 1 | 0 |
|   | 0 | 0 | 0 | 1 | 0 |
| 6 | 0 | 0 | 0 | 1 | 0 |
|   | 0 | 0 | 0 | 0 | 1 |
| 7 | 0 | 0 | 0 | 0 | 1 |
|   | 0 | 0 | 0 | 1 | 0 |
| 8 | 0 | 0 | 0 | 0 | 1 |
|   | 0 | 0 | 0 | 0 | 1 |

The logical signal output from logic circuit 120 shown in (m) of FIG. 9 is input to the gain controller 70, which sets the gain to 0, if a level of the logical signal is 0. Therefore, the gain controller 70 outputs waveform (j) of FIG. 9, which is then added to waveform (c) of FIG. by the adder 80, which outputs waveform (k) of FIG. 9. As in the second embodiment, waveform (k) of FIG. 9 is processed, based on waveforms (f) and (g) of FIG. 9, in the nonlinear processing circuit 90, which outputs waveform (1) of FIG. 9.

Figure 10:
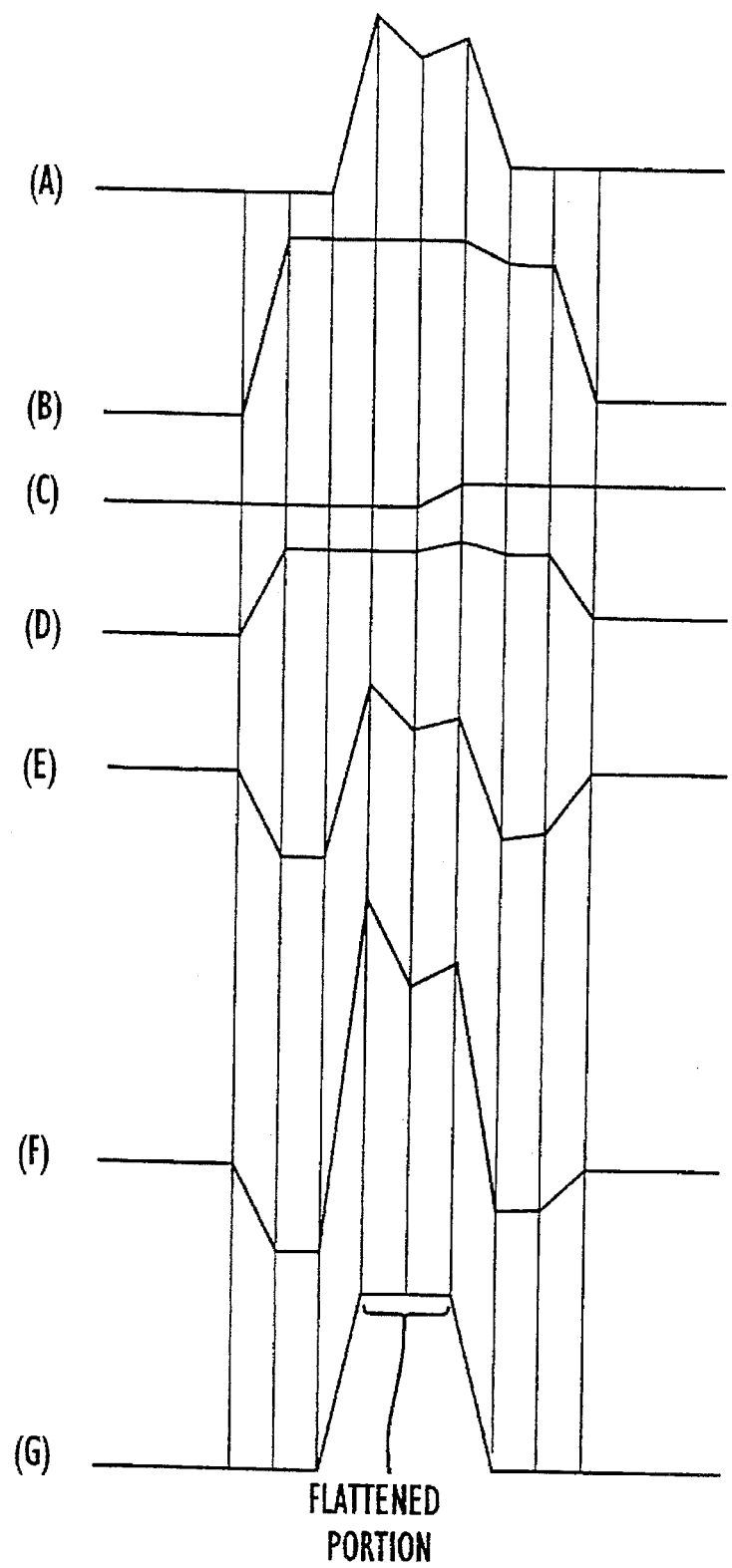
FIG. 10 shows waveforms for showing a manner how a geometric configuration of an original image is lost according to the second preferred embodiment.

In order to discuss differences in the contour restoration between the present embodiment and the second embodiment, let us consider a case in which a hill-shaped contour signal (A) of FIG. 10 having a shallow bottom is processed according to the second preferred embodiment.

In this case, signal (B) of FIG. 10 is obtained as an output of the maximum value detection circuit 40 and signal (C) of FIG. 10 is obtained as an output of the minimum value detection circuit 50. Therefore, the mean value signal becomes (D) of FIG. 10, and the result obtained by subtracting this mean value signal from the original signal (A) becomes (E) of FIG. 10. This result is then added to the original signal, and signal (F) is obtained. This signal (F) is processed by the non-linear processing circuit 90 based on signals (B) and (C) of FIG. 10, and signal (G) is obtained. Thus, according to the second embodiment, the shallow bottom portion of the original signal (A) is flattened as shown in (G) of FIG. 10 and, therefore, the geometric configuration of the original image is lost.

On the other hand, the present embodiment does not bring a distortion on the top of a hill-shaped waveform, as shown in (1) of FIG. 9. In addition, an effect of contour restoration on the falling slope following the hilltop is apparent.

As described above, the third embodiment performs contour restoration without losing the original geometric structure of certain contour images.

Further, the combinations set in the logic circuit 120 are not limited to those shown in Table 1, but a variety of combinations allow the present embodiment to perform more accurate control.

Fourth Preferred Embodiment

Figure 11:
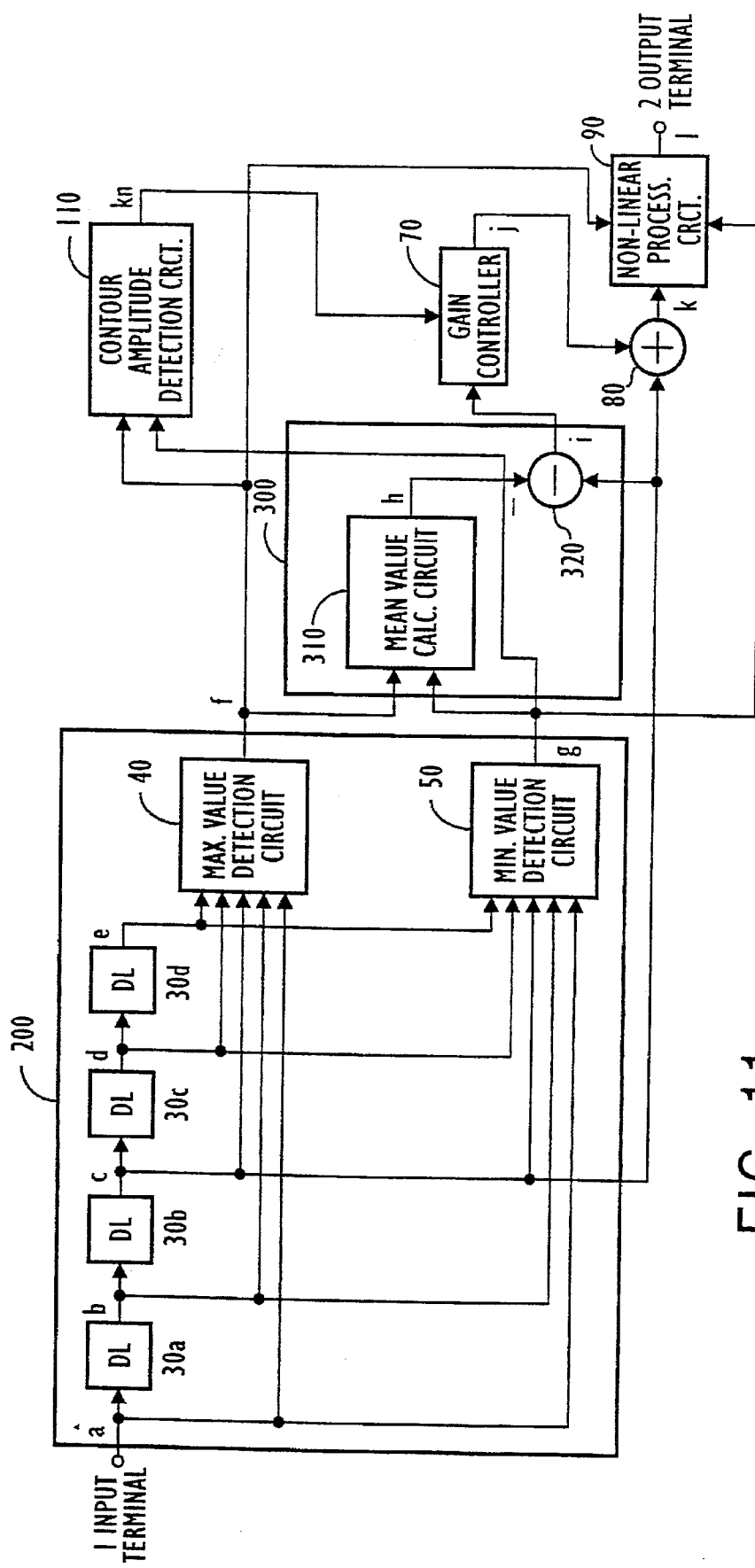
FIG. 11 shows a block diagram of the contour restoration apparatus according to the fourth preferred embodiment of the present invention.

FIG. 11 shows a block diagram of the contour restoration apparatus according to the fourth preferred embodiment of the present invention. This embodiment is the same as the second embodiment except an additional contour amplitude detection circuit 110. The contour amplitude detection circuit 110 is provided with the output signals of the maximum value detection circuit 40 and the minimum value detection circuit 50, and the output signal of the contour amplitude detection circuit 110 is input to the gains controller 70.

Figures 12A, 12B:
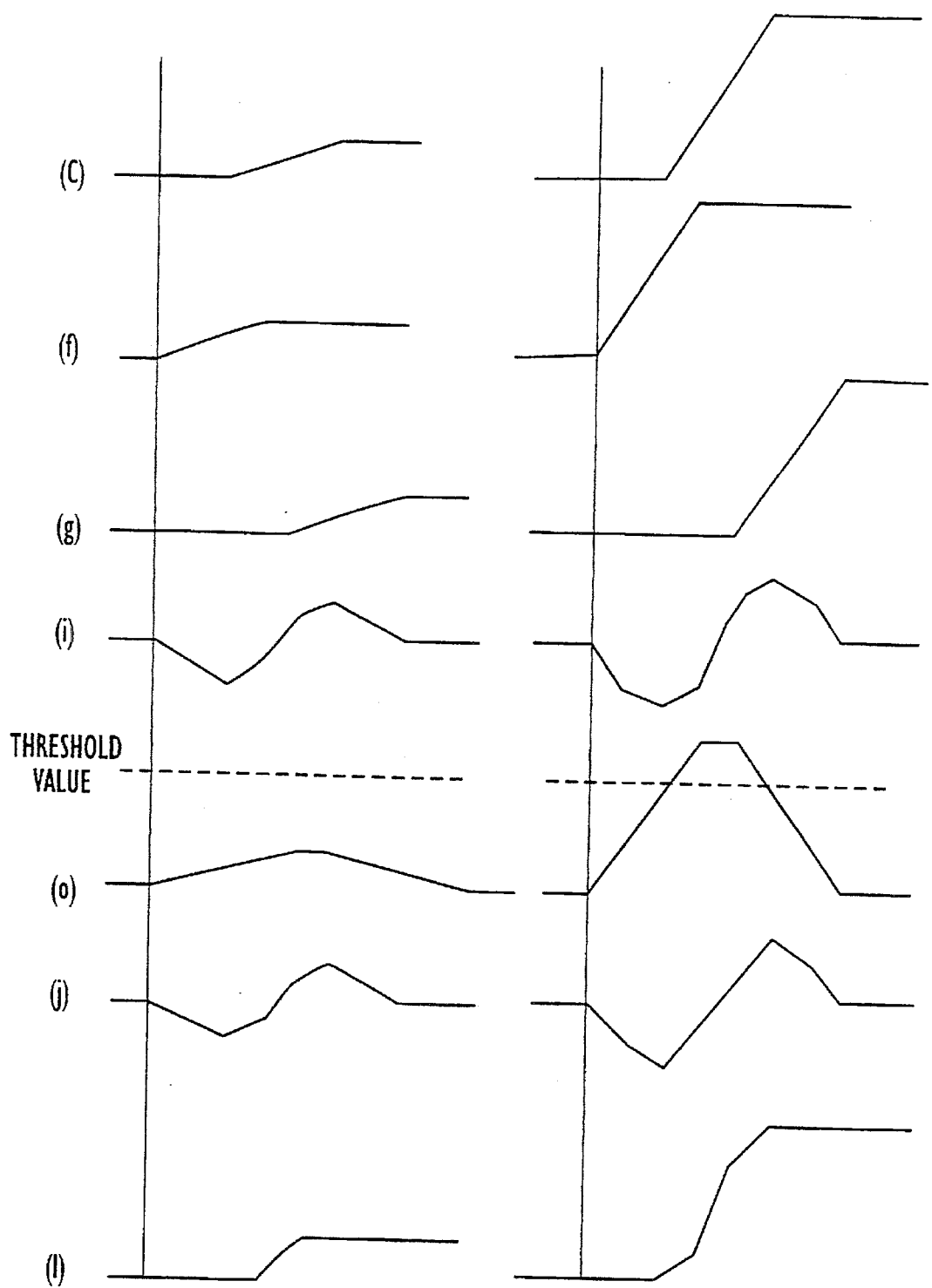
FIG. 12 shows waveforms of signals at points c to l shown in FIG. 11 when two types of video signals are input, respectively.
Figure 13:
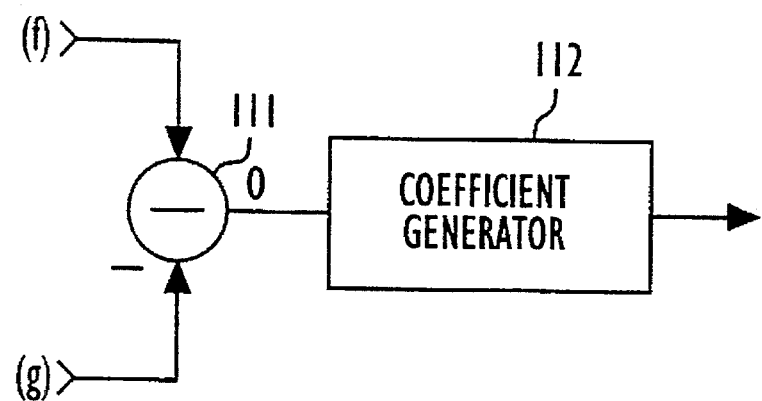
FIG. 13 shows a block diagram of the contour amplitude detector shown in FIG. 12.

The contour amplitude detection circuit 110 is, for example, realized by the circuit of FIG. 13. In FIG. 13, a reference numeral 111 denotes a subtractor, and 112 denotes a coefficient generator. In FIG. 12, output signals (f) and (g) of the maximum value detection circuit 40 and minimum value detection circuit 50 are input to the subtractor 111, which outputs the subtracted signal into the coefficient generator 112. Here, the results of the subtractor 111 represent contour amplitude levels. The coefficient generator 112 outputs a coefficient Kn, which determines the gain of the gain controller 70, depending on an input contour amplitude level. The coefficient generator 112 comprises, for example, a comparator, which compares the input signal with a predetermined threshold value and sets the coefficient as Kn=0.5, for example, if a signal level is greater than the threshold value. If a signal level is less than the threshold value, then the coefficient is set, for example, as Kn=1.0.

The operation of the contour restoration apparatus organized as above is described below with reference to waveforms of FIG. 12. First, if, for example, waveforms having different amplitude levels shown in (c) of (A) and (c) of (B) of FIG. 12, where (c) shows signals at point c in FIG. 11 assuming it is a point under consideration, are applied to the input terminal 1, respectively, then the output signals of the maximum value detection circuit 40 and the minimum value detection circuit 50 are respectively (f) and (g) (A) and (B) of FIG. 13. Therefore, signals having waveforms (i) of (A) and (B) are obtained as the output of the subtractor 320. The operation so far is the same as the first preferred embodiment. However, signals (f) and (g) are also input to the contour amplitude detection circuit 110.

The contour amplitude detection circuit 110 generates a coefficient signal km as a gain control signal and applies the same to the gain controller 70 into which the subtracted signal (i) is input. Therefore, the waveform of the output signal (i) of the subtractor 320 is adjusted to produce waveform (j), which is added to the output signal (c) of the delay circuit 30b by the adder 80 and provided to the nonlinear processing circuit 90. The nonlinear processing circuit 90 processes the input signal based on the output signals (f) and (g) of the maximum value detection circuit 40 and the minimum value detection circuit 50 as in the second embodiment and obtains restored contour signals having waveforms (1) of FIG. 12.

Figures 14A, 14B:
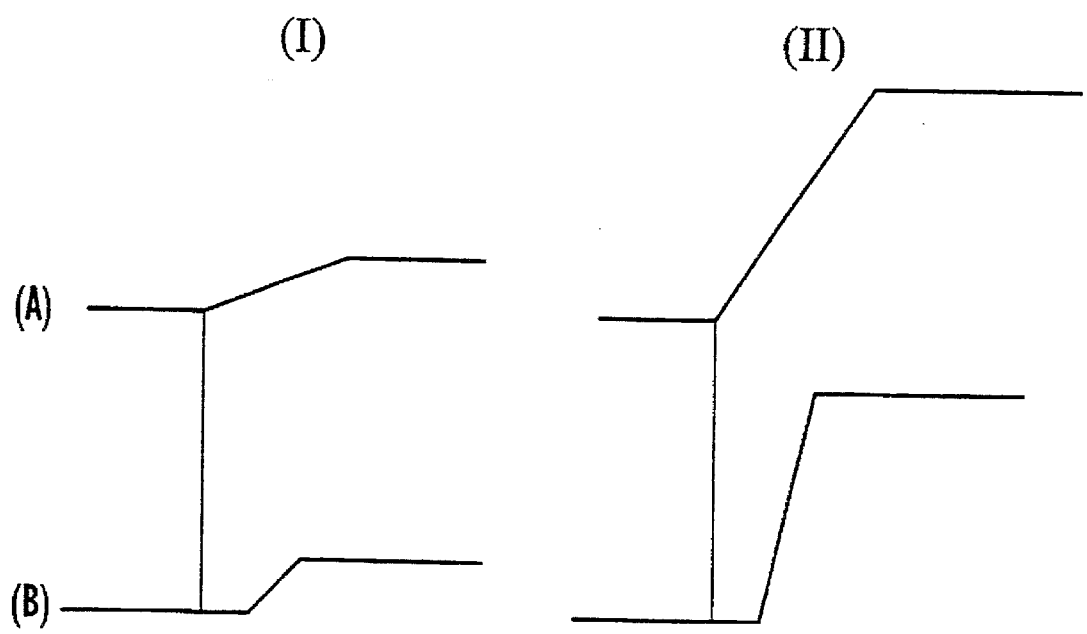
FIG. 14 shows a manner how obtique contours are distorted in the second embodiment.
Figure 15:
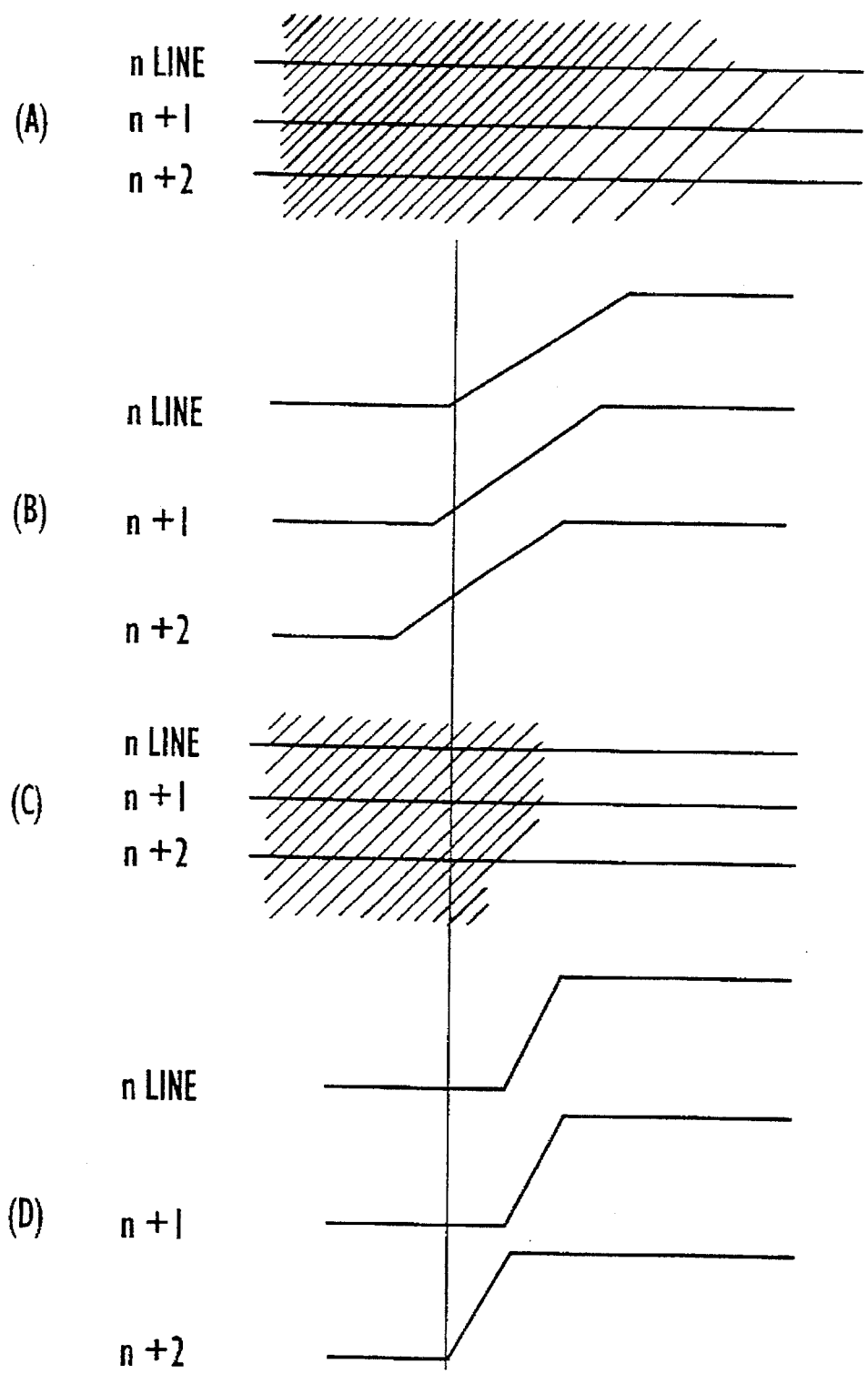
FIG. 15 is a microscopic explanation how an image having an oblique contour is distorted in the second embodiment.

In order to compare the present embodiment with the second preferred embodiment, suppose that contour signals having different contour amplitude levels shown in (a) of (I) and (II) of FIG. 14, which are the same as waveforms shown in (c) of FIG. 12, are processed by the second embodiment. Then, restored contour signals are shown in (B) of (I) and (II) of FIG. 14. Since the amplitude suppressed by the nonlinear processing circuit 90 is large for a contour having a large amplitude, the effects on the improvement of sharpness are large. However, accompanying distortions are also large. The distortions become noticeable if an oblique contour such as shown in (A) of FIG. 15 is restored in images reproduced by raster scanning as in a television system. Waveforms corresponding to scanning lines of (A) of FIG. 15 are shown in (B) of FIG. 15. If the image (A) is processed for contour restoration by the second embodiment, then an image shown in (C) of FIG. 15 is obtained, and a stepped distortion is produced in an oblique direction. Waveforms corresponding to scanning lines of (C) of FIG. 15 are shown in (D) of FIG. 15. As is clear from (D) of FIG. 15, the distortion is caused by the fact that the minimum unit of a locational shift for representing an oblique line is a one-pixel period, and the amount of a shift less than a one-pixel period can not be represented. And the greater contour amplitude and effects on contour restoration are, the more noticeable distortions become. If the contour amplitude is small, then distortions are hardly noticeable.

As is clear from waveforms (1) of FIG. 12, the present embodiment weakens the effects of contour restoration on a contour having a large amplitude and contrast by setting the gain to a small amount and suppressing distortions produced in an oblique contour. On the other hand, for a contour having a small amplitude, the present embodiment performs the same contour restoration as the second embodiment.

As described above, the forth embodiment performs contour restoration without producing distortions for a contour having any amplitude levels in any direction.

Further, coefficients produced by the coefficient generator 112 are not limited to the two levels of 0.5 and 1.0. These values can be set to different numbers and at many levels depending on contour amplitude.

Fifth Preferred Embodiment

Figure 16:
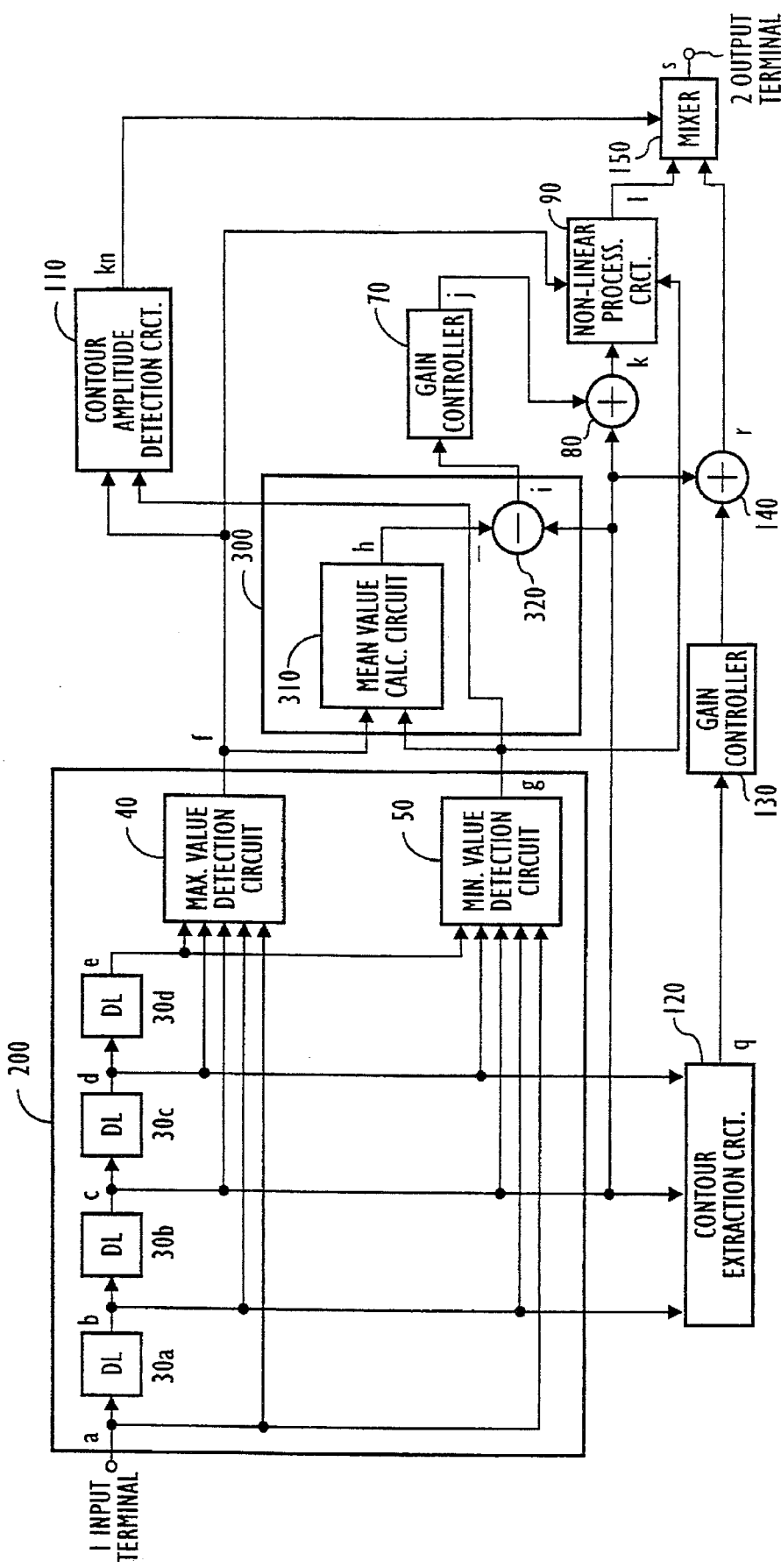
FIG. 16 shows a block diagram of the contour restoration apparatus according to the fifth preferred embodiment of the present invention.

FIG. 16 shows a block diagram of the contour restoration apparatus according to the fifth preferred embodiment of the present invention. This embodiment is the same as the fourth embodiment except that a contour extraction circuit 120, a gain controller 130, an adder 140, and a mixer 150 are added. Signals at points b, c, d in FIG. 16 are applied to the contour extraction circuit 120, whose output is input to the gain controller 130. The output signal of the gain controller 130 is provided to one of the input terminals of the adder 140. The other input terminal of the adder 140 is provided with the signal at point c, and the added result is provided to one of the input terminals of the mixer 150. The other input terminal of the mixer 150 is provided with the output signal of the nonlinear processing circuit 90, and the mixer 150 is controlled by the output signal of the contour amplitude detection circuit 110. The output signal of the mixer 150 is applied to the output terminal 2.

Figures 17A, 17B:
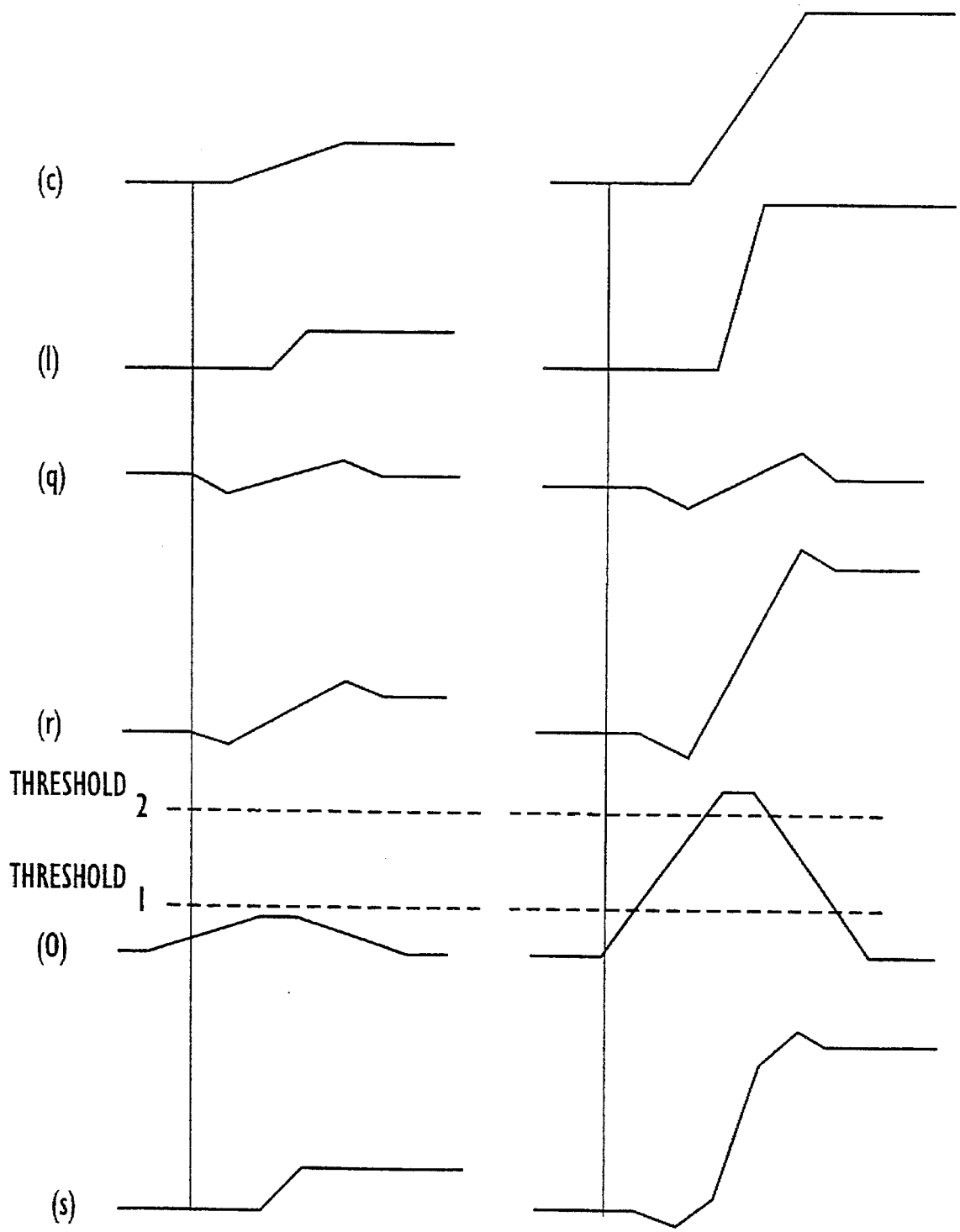
FIG. 17 shows waveforms of signals at points c, l, q, r, Q and S shown in FIG. 16.
Figure 18:
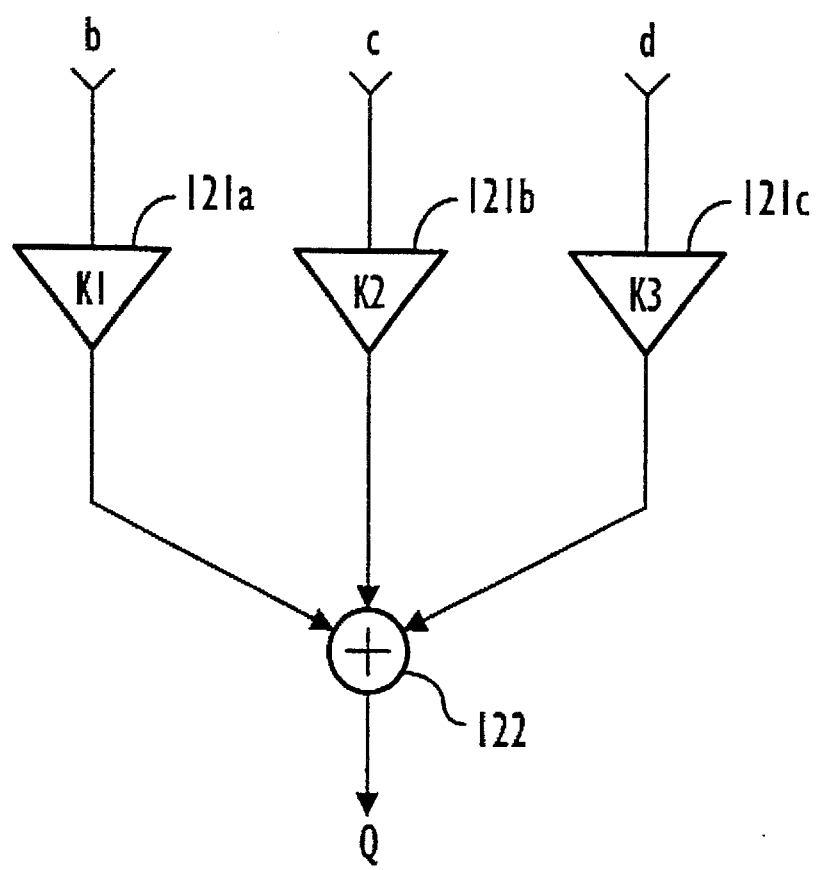
FIG. 18 shows a block diagram of the contour extractor according to the fifth embodiment.

The operation of the contour restoration apparatus organized as above is described below with reference to FIG. 17. First, if, for example, contour signals having different amplitude levels shown in (A) and (B) of FIG. 17 are applied to the input terminal 1, the waveform at point c under consideration is (c) of FIG. 17, and a restored contour signal, whose wave form is shown in (1) of FIG. 17, is output from the nonlinear processing circuit 90 after being treated by a contour gradient restoration type of processing. The operation so far is the same as in the second embodiment. The contour extraction circuit 120 is realized, for example, by the circuit shown in FIG. 18, where 121a, 121b, and 121c denote coefficient multipliers, and 122 denote an adder. The coefficients of coefficient multipliers 121a, 121b, and 121c are set, for example, as K1=−¼, K2=½, K3=−¼, respectively. Then waveforms shown in (q) of FIG. 17 are obtained by adding up the multiplied results at the adder 122. In fact, the contour extraction circuit 120 is a well-known high frequency bandpass filter and extracts a certain contour component. After its amplitude is adjusted by the gain controller 130, the output signal of the contour extraction circuit 120 is added to the original signal (c) of FIG. 17 by the adder 140, which outputs a restored contour signal that is of a high-frequency-enhanced type and has an undershoot and an overshoot, as shown in (r) of FIG. 17.

The contour amplitude detection circuit 110 is realized by basically the same circuit as in FIG. 13, and a signal shown in (o) of FIG. 17 is obtained as output from the subtractor 111 of FIG. 13. The coefficient generator 112 outputs the coefficient Kn that controls the mixer 150 based on the amplitude of the input signal. For example, if an amplitude level is less than a predetermined threshold value T1, then Kn=1. If an amplitude level is between the threshold value T1 and another threshold value T2, then Kn=0.5. If an amplitude level is greater than the threshold value T2, then Kn=0. The mixer 150 calculates the following formula (1) depending on the coefficient Kn.

$$\text{Mixed Output} = Kn \times 1 + (1 - Kn) \times r \qquad (1)$$

where 1 is the output signal of the nonlinear processing circuit, r is the output signal of the adder 140, and $0 \leq kn \leq 1$.

According to formula (1), the less Kn, ie. the greater a contour amplitude level is, the greater the mixing rate of the restored contour signal of a high-frequency-enhanced type becomes. In this way the signal shown in (s) of FIG. 17 is obtained as an output from the mixer 150.

As observed from waveforms (s) of FIG. 17, the present embodiment suppresses distortions produced in oblique contours and gains contour restoration effects as well by setting a high rate of the restored contour signal of a high-frequency-enhanced type for a contour having large amplitude and contrast. Since the contour restoration of a high-frequency-enhanced type is achieved by linear processing, this type of contour restoration does not produce distortions in oblique contours. On the other hand, the present embodiment performs contour restoration of a contour gradient restoration type for contours having small amplitude.

As described above, an embodiment according to the fifth invention performs contour restoration without producing distortions in oblique contours having any amplitude.

Further, the mixing rates of the mixer 150 is not limited to three levels but can be set at many levels. Also, the composition of the contour extractor 120 is not limited to the described one, but can be any circuit as long as it can realize a high frequency bandpass characteristic.

Sixth Preferred Embodiment

Figure 19:
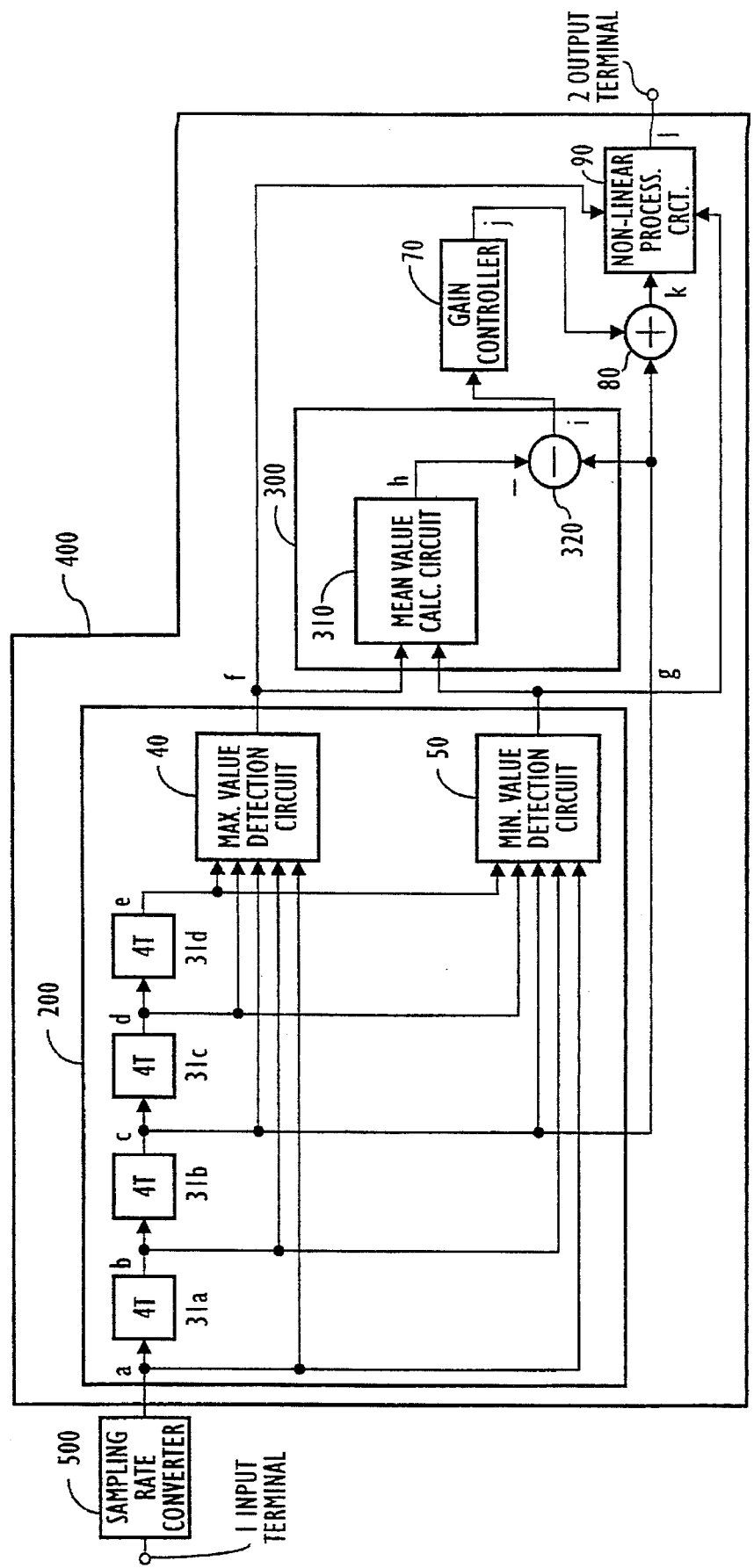
FIG. 19 shows a block diagram of the contour restoration apparatus according to the sixth preferred embodiment of the present invention.

FIG. 19 shows a block diagram of the contour restoration apparatus according to the sixth preferred embodiment. In FIG. 19, a reference numeral 500 denotes a sampling rate converter, and 400 denotes a contour restoration section. The contour restoration section 400 is basically the same as the second embodiment shown in FIG. 4 except that the delay time of each of the delay circuits 31a, 31b, 31c, and 31d is set to a four-pixel period.

Figure 20:
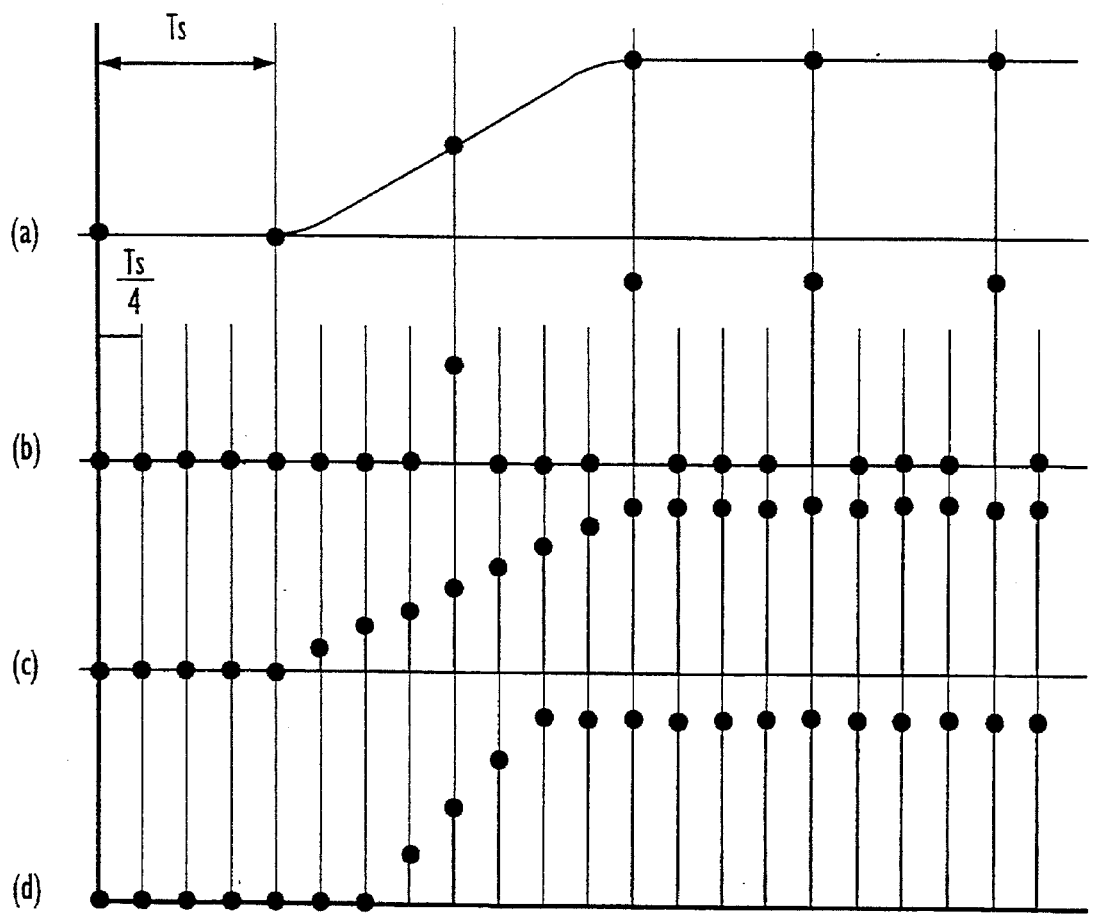
FIG. 20 shows waveforms of signals according to the sixth embodiment.
Figure 21:
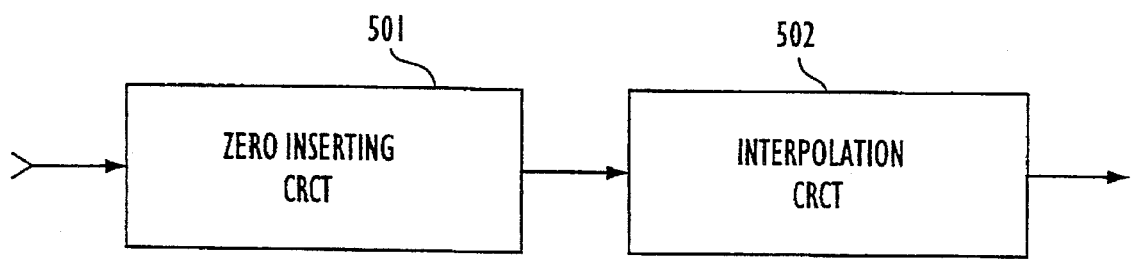
FIG. 21 shows a block diagram of the sampling rate converter of the sixth embodiment.

The operation of the contour restoration apparatus organized as above is described below with reference to FIG. 20. It is assumed that an input video signal is a sampled sequence of pixels having a sampling period Ts. The sample sequence is input to the sampling rate converter 500, which is realized, for example, by the circuit shown in FIG. 21. In FIG. 21, 501 denotes a zero inserting circuit, and 502 denotes an interpolation circuit connected to the zero inserting circuit 501. First, the sample sequence (a) of FIG. 20 is applied to the zero inserting circuit 501. If, for example, the original sampling period Ts is converted to ¼Ts, then the zero inserting circuit 501 puts three zero points between two consecutive sampled points at ¼Ts interval and obtains a new sampled sequence shown in (b) of FIG. 20. Sampled sequence (b) is input to the interpolation circuit 502, which is, for example, a weighted adder. The interpolation circuit 502 replaces each inserted zero with an interpolated value obtained by adding the levels of the original two consecutive sampled points with weights corresponding to the location of the inserted zero. As a result, a sampling sequence having sampling period ¼Ts shown in (c) of FIG. 20 is obtained and input to the contour restoration section 400. The contour restoration section 400 performs the same processing as the contour restoration apparatus of the second embodiment and outputs a restored contour signal, ie. a restored sampled sequence, shown in (d) of FIG. 20.

As observed from (d) of FIG. 20, since the period of one pixel, ie. the minimum unit of a locational shift, is converted to ¼ of the one in the second embodiment, distortions produced in oblique contours are suppressed (See FIG. 15).

As described above, the sixth embodiment performs contour restoration without producing distortions in oblique contours.

Further, the conversion rate of sampling period in the sampling rate converter 500 is not limited to ¼ and can be set to any amount so far as a converted sampling period is less than the original sampling period. Therefore, the delay time of each of the delay circuits 31a, 31b, 31c, and 31d is not limited to ¼Ts but should be set in accordance with the converted sampling period.

Seventh Preferred Embodiment

Figure 22:
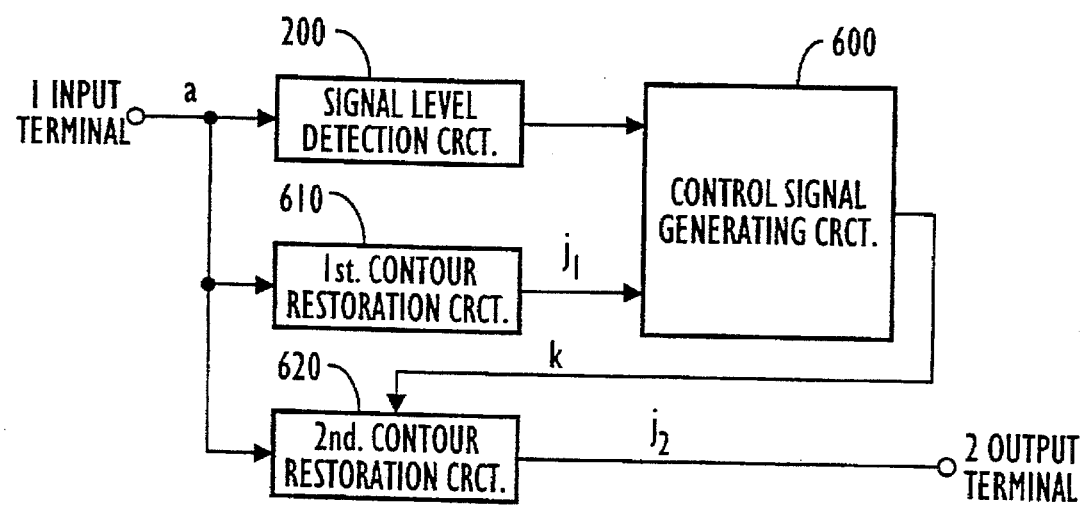
FIG. 22 shows a block diagram of the contour restoration apparatus according to the seventh preferred embodiment of the present invention.

FIG. 22 shows a block diagram of the contour restoration apparatus according to the seventh preferred embodiment of the present invention. In FIG. 22, a reference numeral 1 denotes an input terminal for video signals, 200 denotes a signal level detection circuit, 610 denotes a first contour restoration circuit, 620 denotes a second contour restoration circuit, 600 denotes a control signal generator, and 2 denotes an output terminal. A video signal applied to the input terminal 1 is applied to the signal level detection circuit 200, first contour restoration circuit 610; and second contour restoration circuit 620, respectively. The output signals of the signal level detection circuit 200 and first contour restoration circuit 610 are input to the control signal generator 600. The output signal of the control signal generator 600 is input to the control terminal of the second contour restoration circuit 620, and the output signal of the second contour restoration circuit 620 is applied to the output terminal 2.

Signal level detector 200 is the same as signal level detection circuit 200 according to the first preferred embodiment.

Figure 23A:
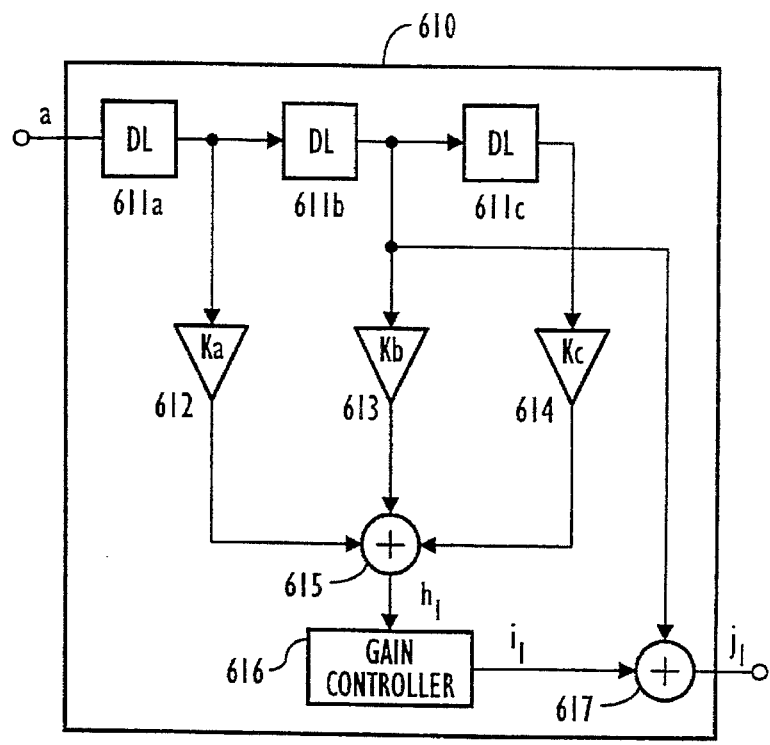
FIGS. 23(A) and 23(B) show block diagrams of the first and second contour restoration circuits according to the seventh embodiment, respectively.
Figure 23B:
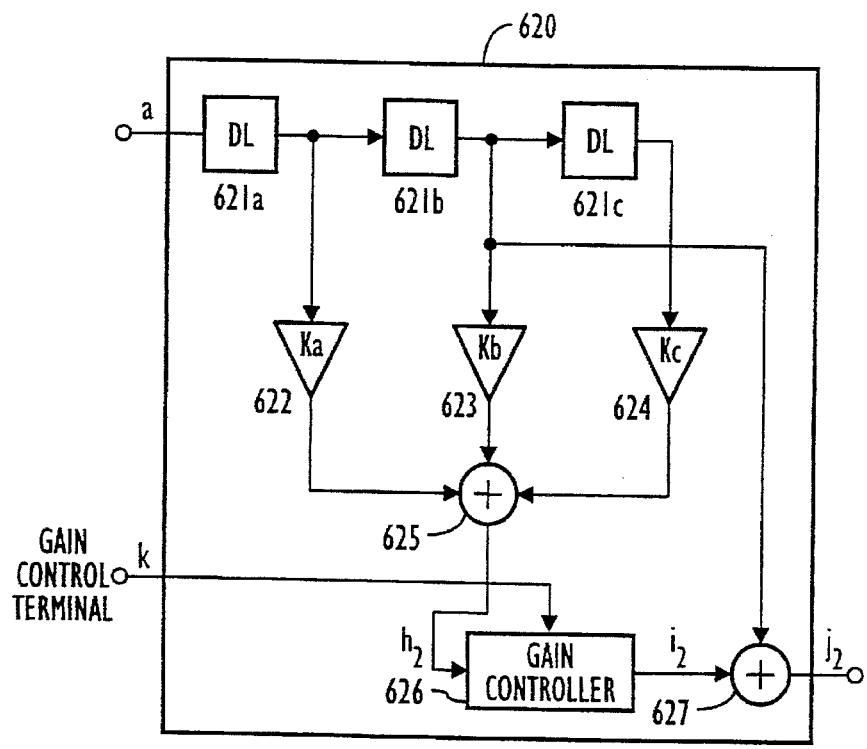
Figure 24:
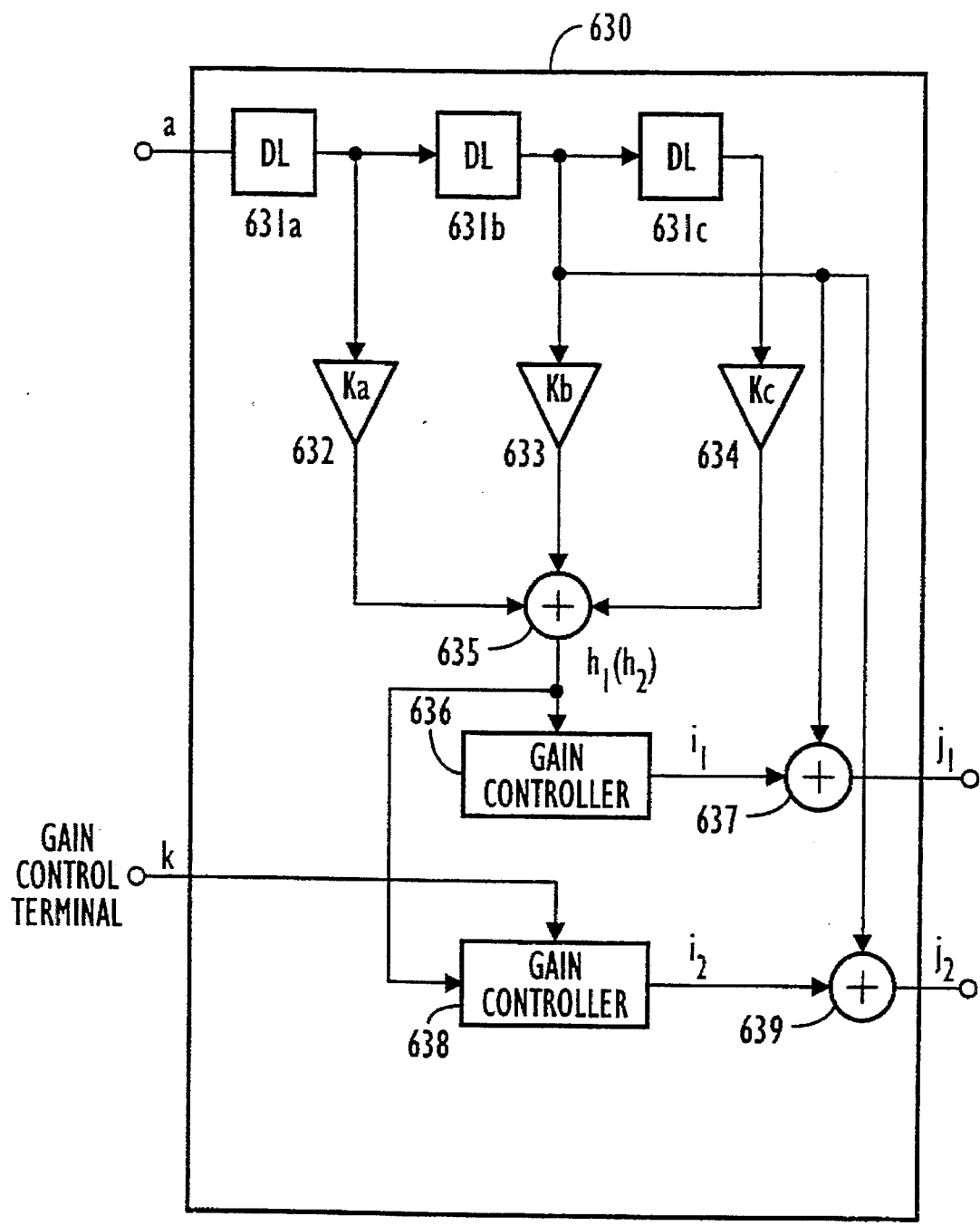
FIG. 24 shows a block diagram of the combined first and second contour restoration circuits according to the seventh embodiment.
Figure 34:
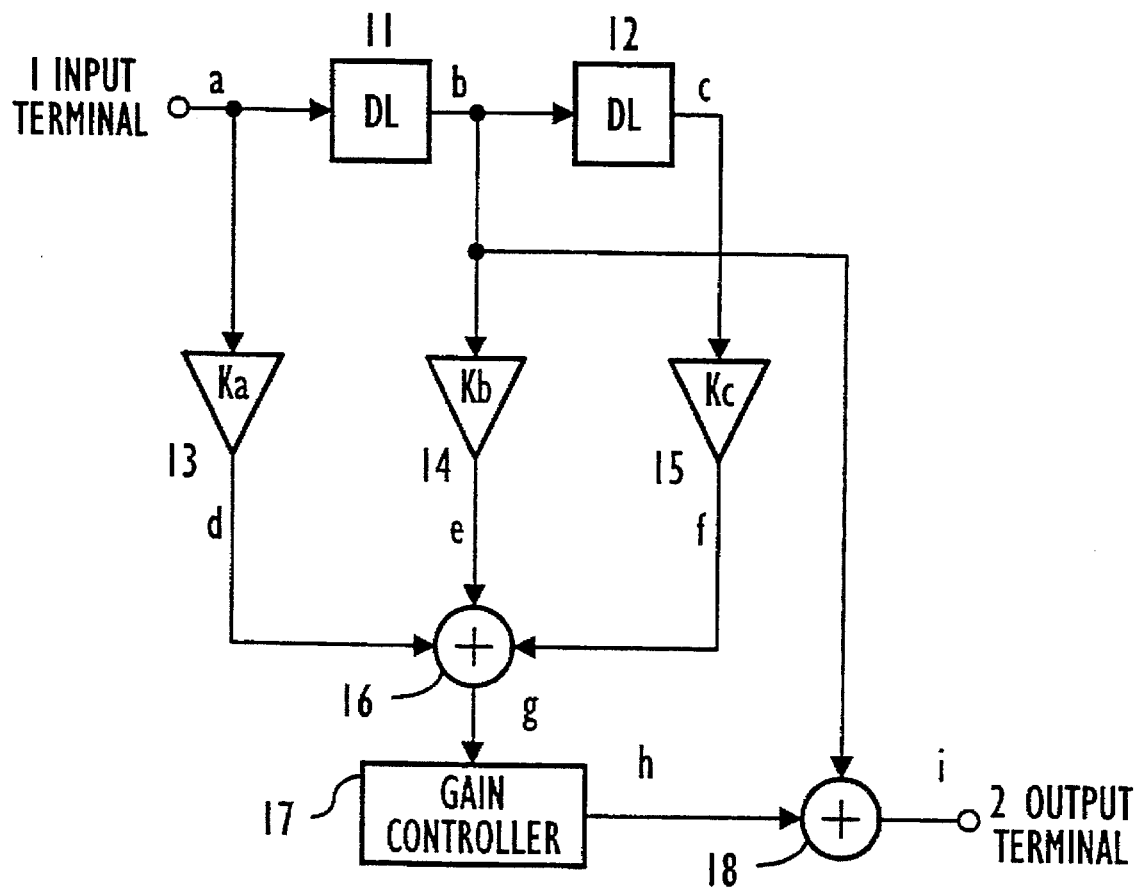
FIG. 34 shows a block diagram of a prior contour restoration apparatus.
Figure 35:
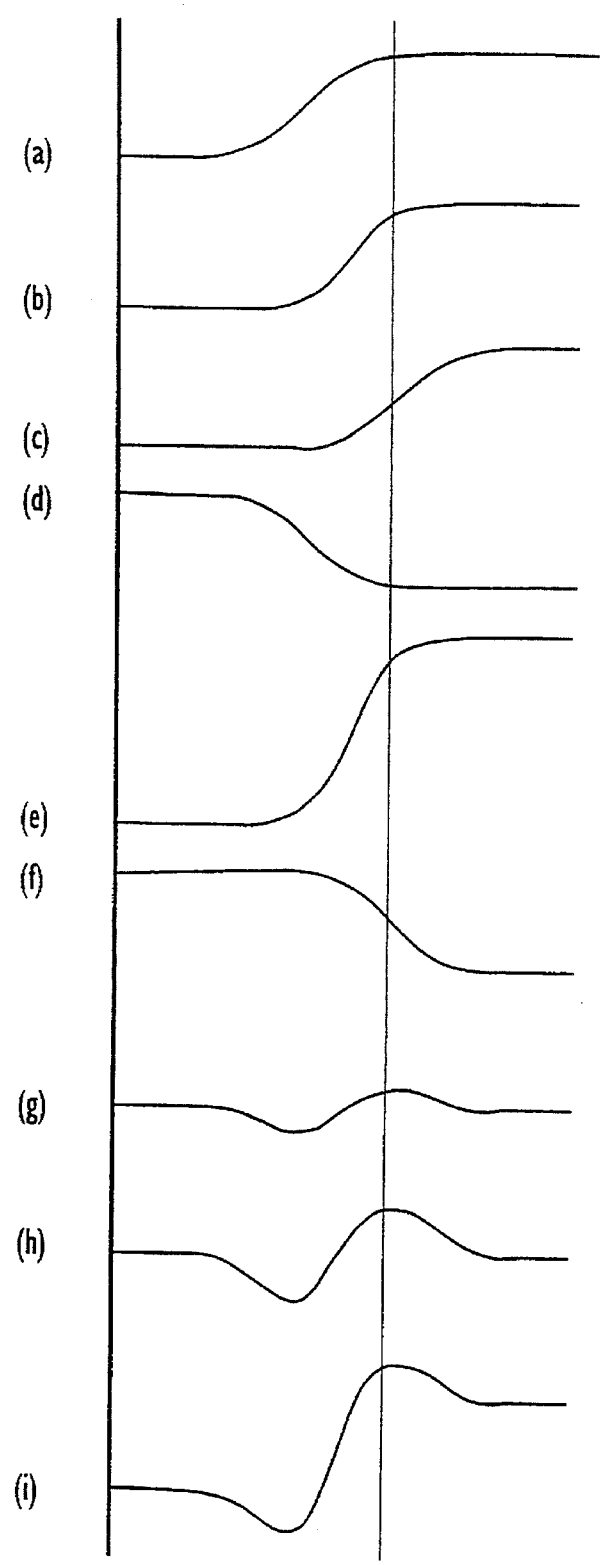
FIG. 35 shows waveforms of signals at respective points shown in FIG. 34.

The first contour restoration circuit 610 and second contour restoration circuit 620 are organized, for example, as shown in FIG. 23(A) and FIG. 23(B), respectively. These are basically the same as prior contour restoration apparatus shown in FIG. 34 except that the output signal of the control signal generator 600 is applied to a gain control terminal of a gain controller 626 of the second contour restoration circuit 620. Alternatively, the first contour restoration circuit 610 and second contour restoration circuit 620 can be combined into the circuit as shown in FIG. 24. In the following description, FIG. 23 is used.

Figure 25:
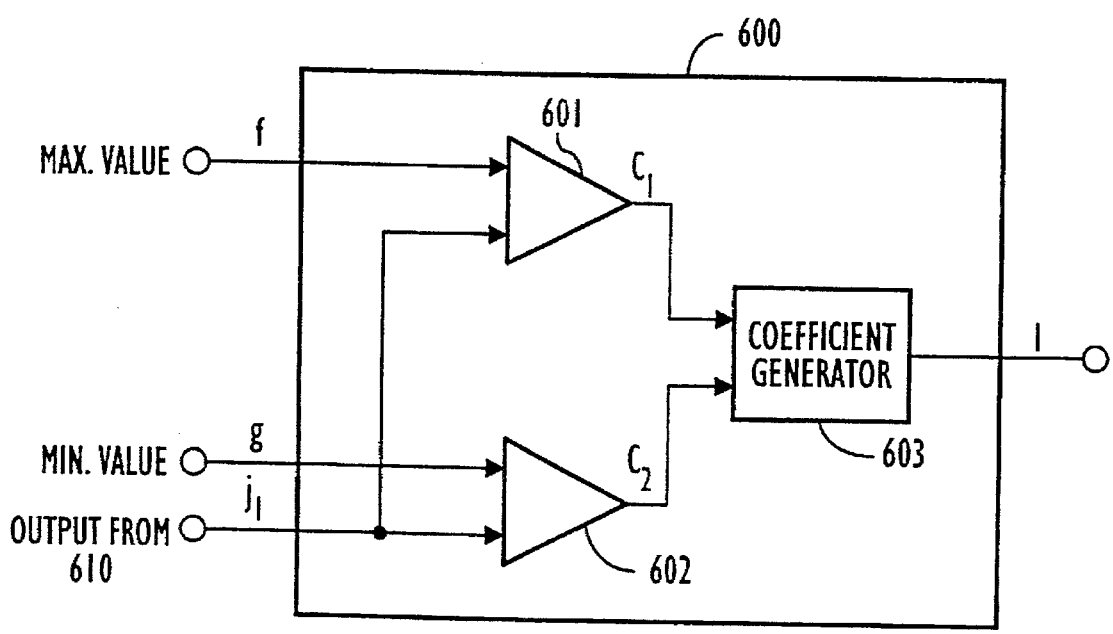
FIG. 25 shows a block diagram of the control signal generator according to the seventh embodiment.

The control signal generator 600 is realized, for example, by the circuit shown in FIG. 25. In FIG. 25, the output signal f of the maximum value detector 40 of the signal level detection circuit 200 and the output signal j1 of the first contour restoration circuit 610 are input to a comparator 601, where their amplitude levels are compared. Similarly, the output signal g of the minimum value detector 50 of the signal level detection circuit 200 and the output signal j1 of the first contour restoration circuit 610 are input to another comparator 602, where their amplitude levels are compared. The output signals c1 and c2 of the comparators 601 and 602 are applied to a coefficient generator 603, whose output signal is applied to the gain control terminal of the gain controller 626 of the second contour restoration circuit 620.

Figure 26:
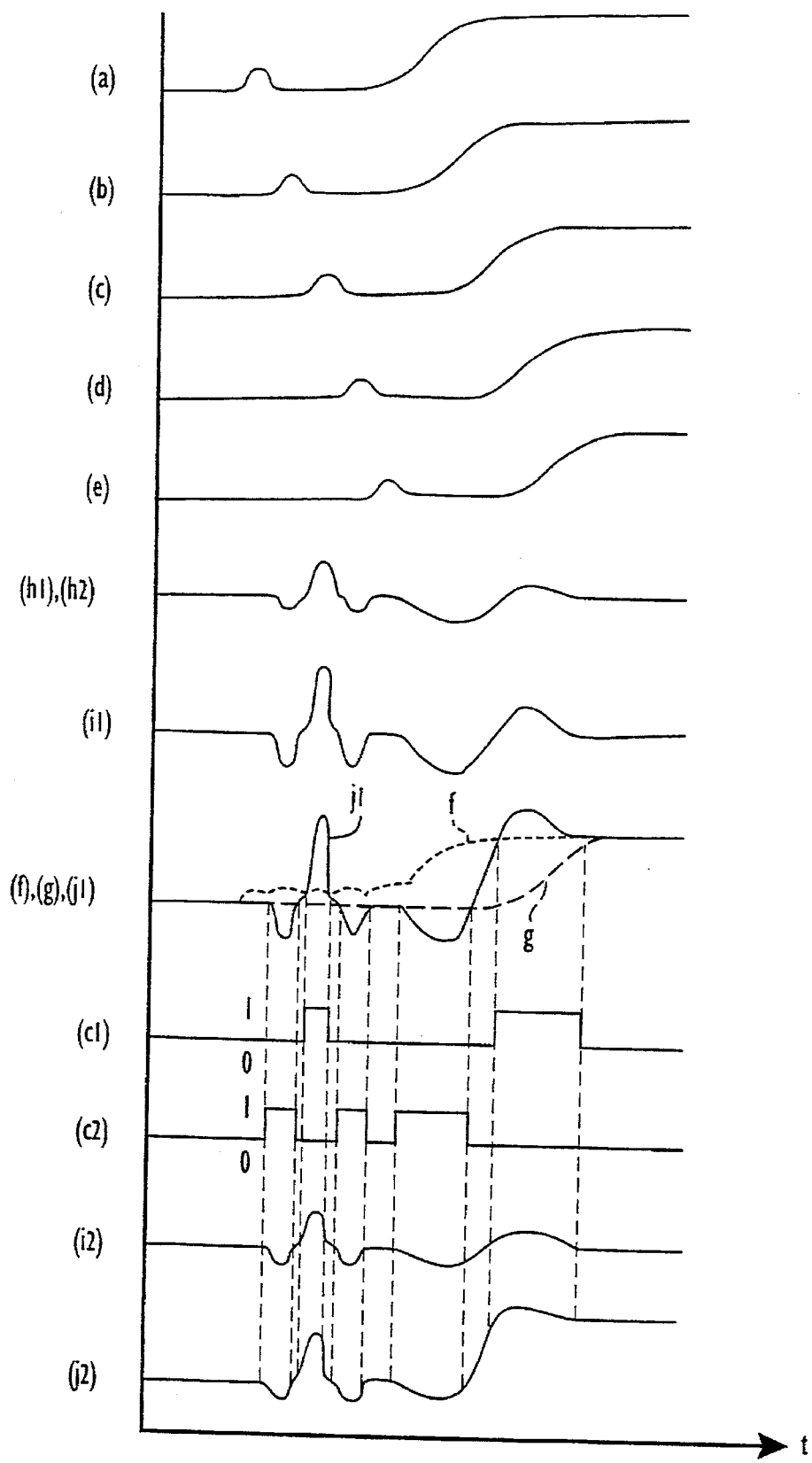
FIG. 26 shows waveforms of signals at respective points shown in FIGS. 23(A) and 23(B) or FIG. 24 according to the seventh embodiment.

The operation of the contour restoration apparatus organized as above is described below with reference to waveforms of FIG. 26. First, if, for example, a video signal shown in (a) of FIG. 26 is applied to the input terminal 1, then the signal is delayed by the delay circuits 30a, 30b, 30c, and 30d of the signal level detection circuit 200 and becomes signals (b), (c), (d), and (e) of FIG. 26 at points b, c, d, and e respectively. The input video signal and signals at points b, c, d, and e are input to the maximum value detection circuit 40 and minimum value detection circuit 50, which output respectively the maximum value (FIG. 26 (f)) and the minimum value (FIG. 26 (g)).

The input video signal is also input to the first contour restoration circuit 610. If the coefficients of multipliers 612, 613, and 614 of the first contour restoration circuit 610 are respectively Ka=−1, Kb=2, and Kc=−1, and the set gain is 2, then the output signal of the adder 615 becomes (h1) of FIG. 26 at point h1, and the output signal of the gain controller 616 becomes (i1) of FIG. 26 at point i1. The last signal is added to the output signal of the delay circuit 611b (the same as the signal at point c) by the adder 617, which outputs the signal shown in (j1) of FIG. 26 at point j1. The input video signal applied to the second contour restoration circuit 620 is processed in the same way up to the adder 625, which outputs the same signal as (h1) of FIG. 26 at point h2.

The restored contour signal output from the first contour restoration circuit 610 and the maximum and minimum values are input to the control signal generator 600, which detects undershoots and overshoots that were added to the input video signal by the first contour restoration circuit 610 and outputs corresponding predetermined coefficients. First, the input maximum values, ie. the signal at point f, and the output signal of the first contour restoration circuit 610, ie. the signal at point j1, are input to the comparator 601, which compares their amplitude levels. For example, if a level of the output signal of the first contour restoration circuit 610 is greater than the corresponding maximum value, then value 1 is output by the comparator 601; otherwise value 0 is output. Then the output signal of the comparator 601, ie. the signal at point c1, becomes (c1) of FIG. 26. Similarly, the input minimum values, ie. the signal at point g, and the output signal of the first contour restoration circuit 610, ie. the signal at point j1, are provided to the comparator 602, which compares their amplitude levels. For example, if a level of the output signal of the first contour restoration circuit 610 is less than the corresponding minimum value, then value 1 is output; otherwise value 0 is output. Then the output signal of the comparator 602, ie. the signal at point c2, becomes (c2) of FIG. 26. The output signals of the comparators 601 and 602 are applied to the coefficient generator 603, which, based on them, outputs a coefficient K that determines the gain of the gain controller 626 of the second contour restoration circuit 620. For example, K=0.5 is output, if (c1=1 and c2=0) or (c1=0 and c2=1); otherwise K=2 is output. In this case, the amplitude of the output signal of the adder 6.25, ie. the signal at point h2, is adjusted with piecewise different coefficients, ie. K=0.5 on the shoot part and k=2 on the other part that include a rising part, by the gain controller 626, and a contour restoration signal shown in (i2) of FIG. 26 is obtained at point i2. The obtained signal is added to the output signal of the delay circuit 621b (the same as the signal at point c) by the adder 627 and output through the output terminal 2 as a video signal having a restored contour shown in (j2) of FIG. 25.

Figure 27A:
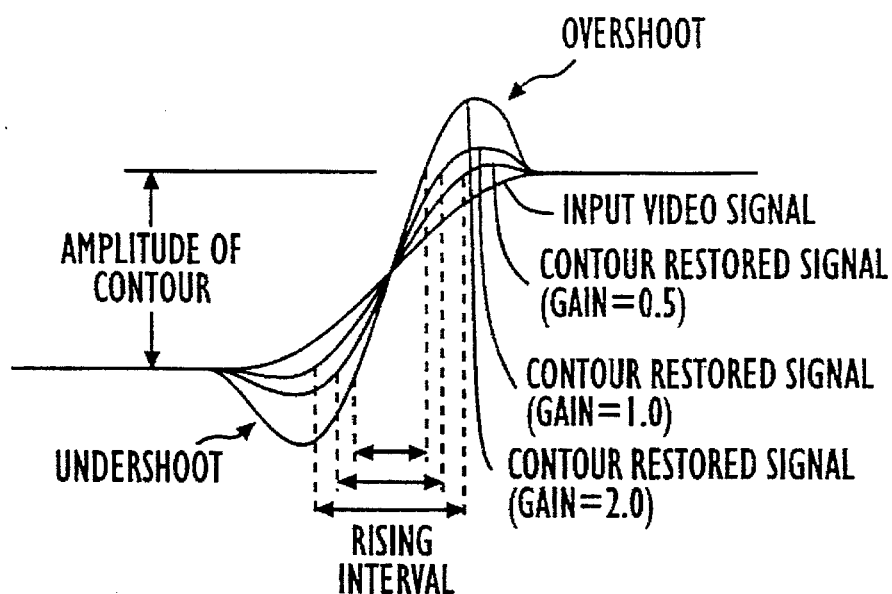
FIG. 27(A) shows characteristic curves of signals restored with various gain values according to the prior art.
Figure 27B:
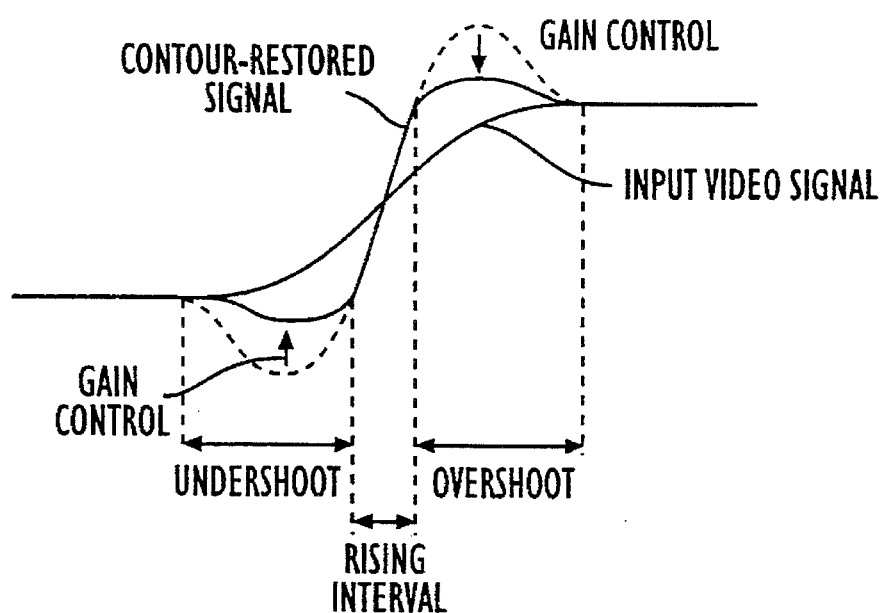
FIG. 27(B) shows a characteristic curve of a signal restored according to the seventh embodiment of the present invention.

The effects of contour restoration by the present embodiment is described below with reference to FIG. 27. Prior contour restoration apparatus described in Description of the Related Art performs contour restoration by adding a contour restoration component to the input video signal, and the amount of restoration is controlled by adjusting the amplitude of the restoration component at any given gain. As shown in FIG. 27(A) which shows the contour restoration according to the prior art, the greater the gain is set, the steeper the rising slope of the waveform of the contour-restored signal becomes, and the greater the added amounts of an undershoot and an overshoot become. When performed excessively, this contour restoration makes black and white hems and an unnatural appearance noticeable in a fine image and in parts where the contour amplitude is small. Therefore, before adding a restoration component to the input video signal, the present embodiment independently adjusts the gain for two different parts of the restoration component, one part that produces an undershoot and an overshoot when added to the input video signal, and the other part that includes a rising part and a falling part. As a result, as shown in FIG. 27(B), the added amount of an undershoot and an overshoot is suppressed while keeping a steep slope at a rising part and a falling part.

As described below, the seventh embodiment adjusts the gain with a different coefficient for an undershoot and overshoot part detected by the control signal generator 600 from the other part so that restored steep contours are obtained without adding excessive undershoots or overshoots, and an unnatural appearance of contours in an image are reduced.

Eighth Preferred Embodiment

Figure 28:
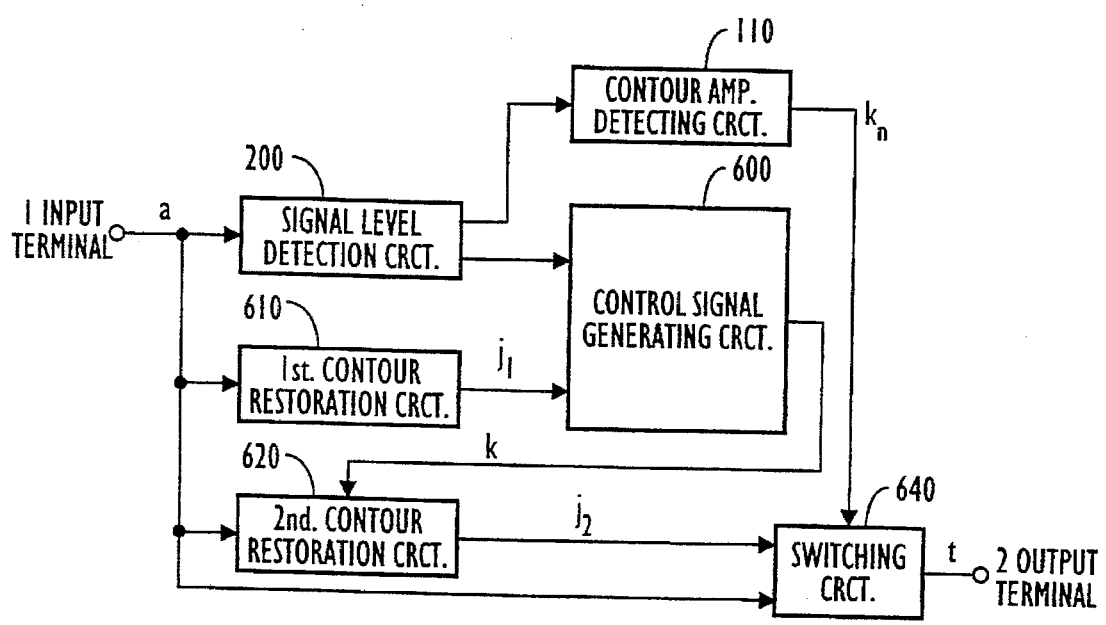
FIG. 28 shows a block diagram of the contour restoration apparatus according to the eighth preferred embodiment of the present invention.

FIG. 28 shows a block diagram of the contour restoration apparatus according to the eighth preferred embodiment of the present invention. This embodiment is the same as the seventh embodiment shown in FIG. 22 except an additional contour amplitude detector 110 that reads the output signals of the signal level detection circuit 200 and an additional switching circuit 640 that reads the input video signal and the output signal of the second contour restoration circuit 620 and is controlled by the output signal of the contour amplitude detection circuit 110.

Figure 31:
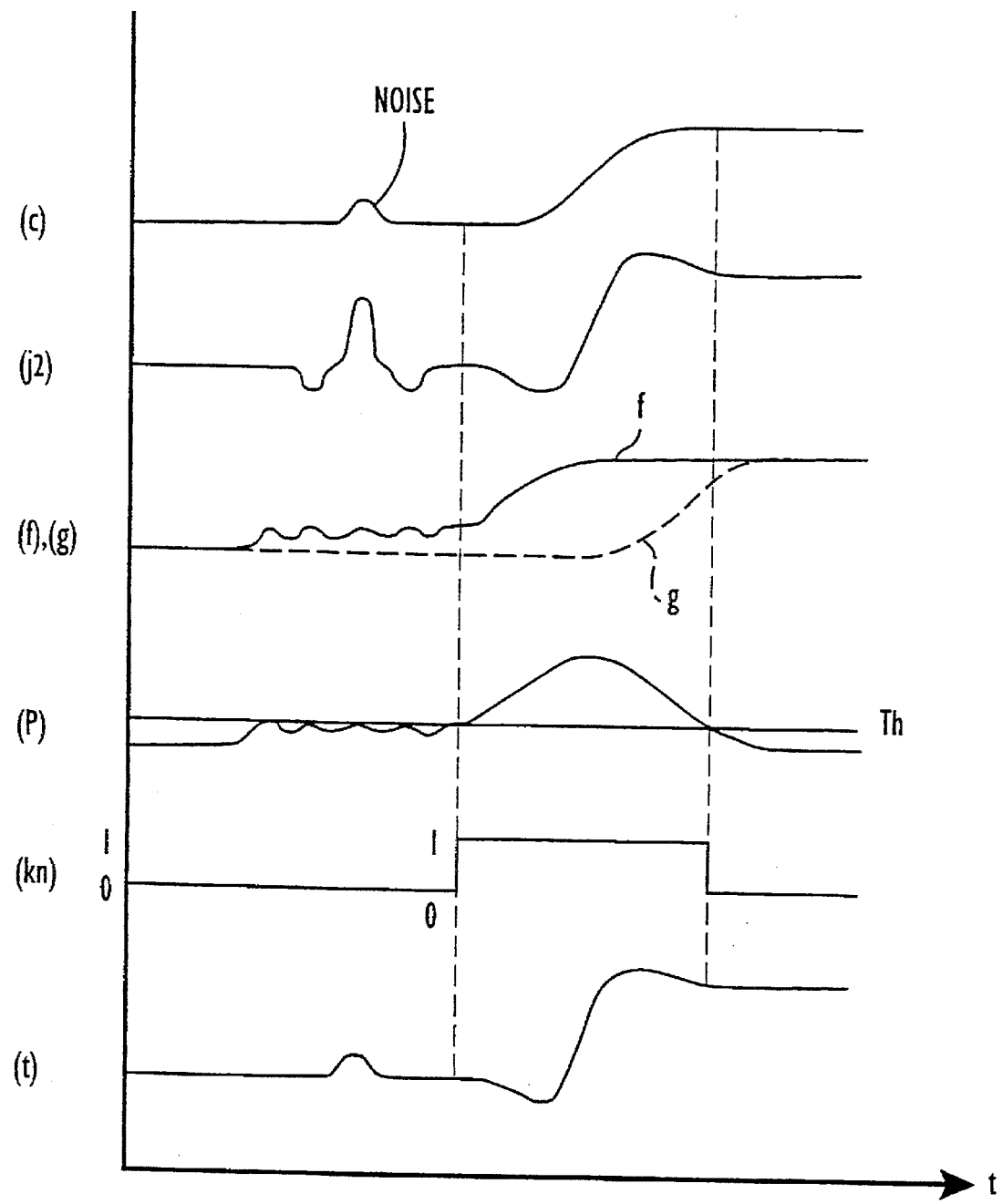
FIG. 31 shows waveforms of signals at respective points shown in FIGS. 28, 29 and 30.

The operation of the contour restoration apparatus organized as above is described below with reference to waveforms of FIG. 31. The operation up to second contour restoration circuit 620 is the same as that of an embodiment according to the seventh embodiment.

Figure 29:
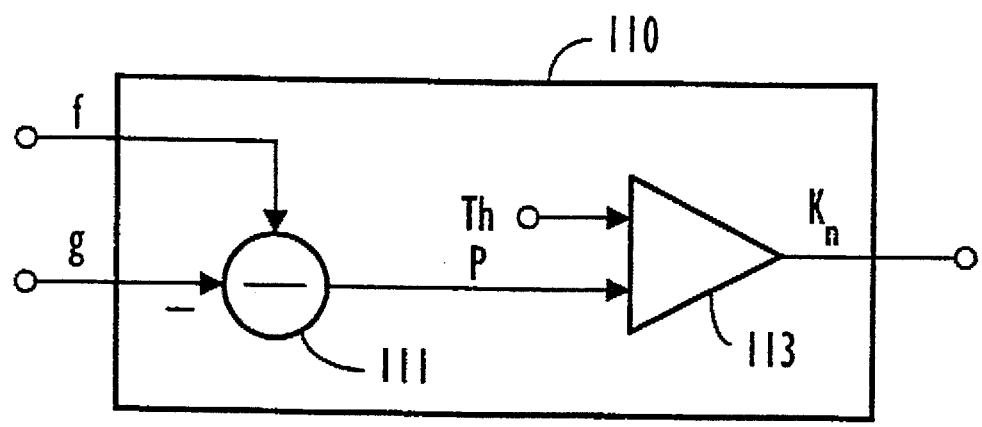
FIG. 29 shows a block diagram of the contour amplitude detector shown in FIG. 28.

The contour amplitude detection circuit 110 is basically the same as the one shown in FIG. 13 and described for the fourth embodiment and comprises subtractor 111 and comparator 113 as shown in FIG. 29. The differences between the maximum value, ie. the signal at point f, and the minimum value, ie. the signal at point g, are obtained by the subtractor 111. The comparator 113 compares the difference signal, ie. the signal shown in (p) of FIG. 31, with a predetermined threshold value Th and outputs the result. For example, if a level of the difference signal is greater than Th, then 1 is output; otherwise 0 is output. Then the output signal of the comparator 113 becomes the one shown in (kn) of FIG. 31. This signal is output from the contour amplitude detection circuit 110 and provided to the control terminal of a switching circuit 640.

Figure 30:
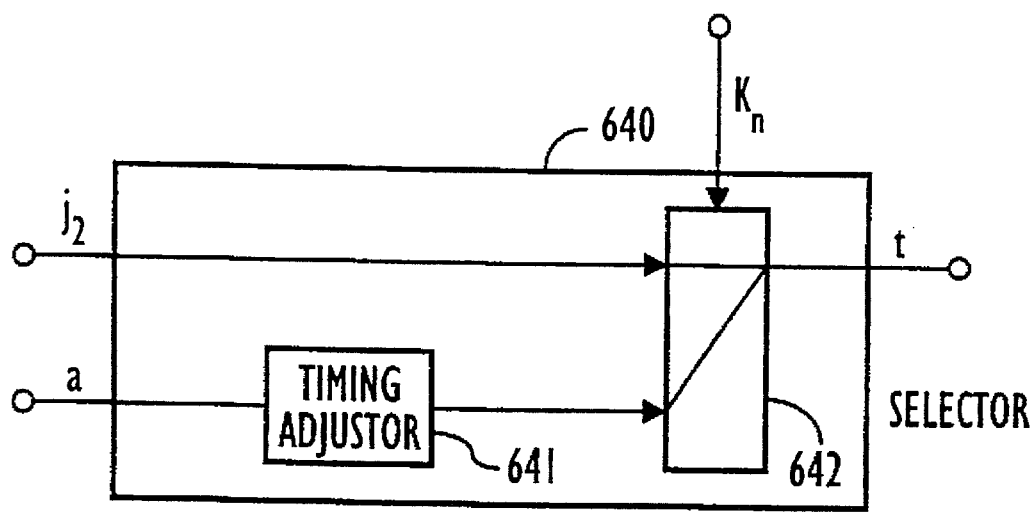
FIG. 30 shows a block diagram of the switching circuit shown in FIG. 28.

The switching circuit 640 comprises a timing adjuster 641 and a selector 642 as shown in FIG. 30. Based on the control signal at point kn output from the contour amplitude detection circuit 110, the switching circuit 640 selects the output signal at point J2 of the second contour restoration circuit 620, if the control signal is 1; if the control signal is 0, then the input video signal, whose timing is adjusted to that of the signal at point j2 by the timing adjuster 641, is selected. The output signal at point p of the subtractor 111 represents the amplitude of a restored contour, and if a level of the amplitude is greater than Th, then the restored contour signal is selected; otherwise the original input video signal is selected. In this way, the signal shown in (t) of FIG. 31 is output to the output terminal 2.

As above, an embodiment according to the eighth embodiment adjusts the gain with a different coefficient for the undershoot or overshoot part so that a restored steep contour is obtained without adding excessive undershoots or overshoots, and an unnatural appearance of a contour in an image is reduced. Further, the embodiment does not perform contour restoration for the part in which the change of contour amplitude is small so that noise is not enhanced.

Further, as a variant of the present embodiment, the output signal of the contour amplitude detector 110 can be applied to the coefficient generator 603 of the control signal generator 600, and levels of contour amplitude can be additionally taken into consideration in setting the coefficients.

Further, the present embodiments according to the seventh and eighth embodiments extracted video signals in the horizontal direction, but the extraction can be made in any direction so far as it is the same as for the detection of the maximum and minimum values. For example, video signals can be extracted in the vertical or diagonal direction. Moreover, the coefficients of the coefficient generator 603 are not limited to two values and can be set to many values depending on the amount of amplitude in the shoot part. Also, the coefficients for the undershoot part can be set independently of the coefficients for the overshoot part.

Ninth Preferred Embodiment

Figure 32:
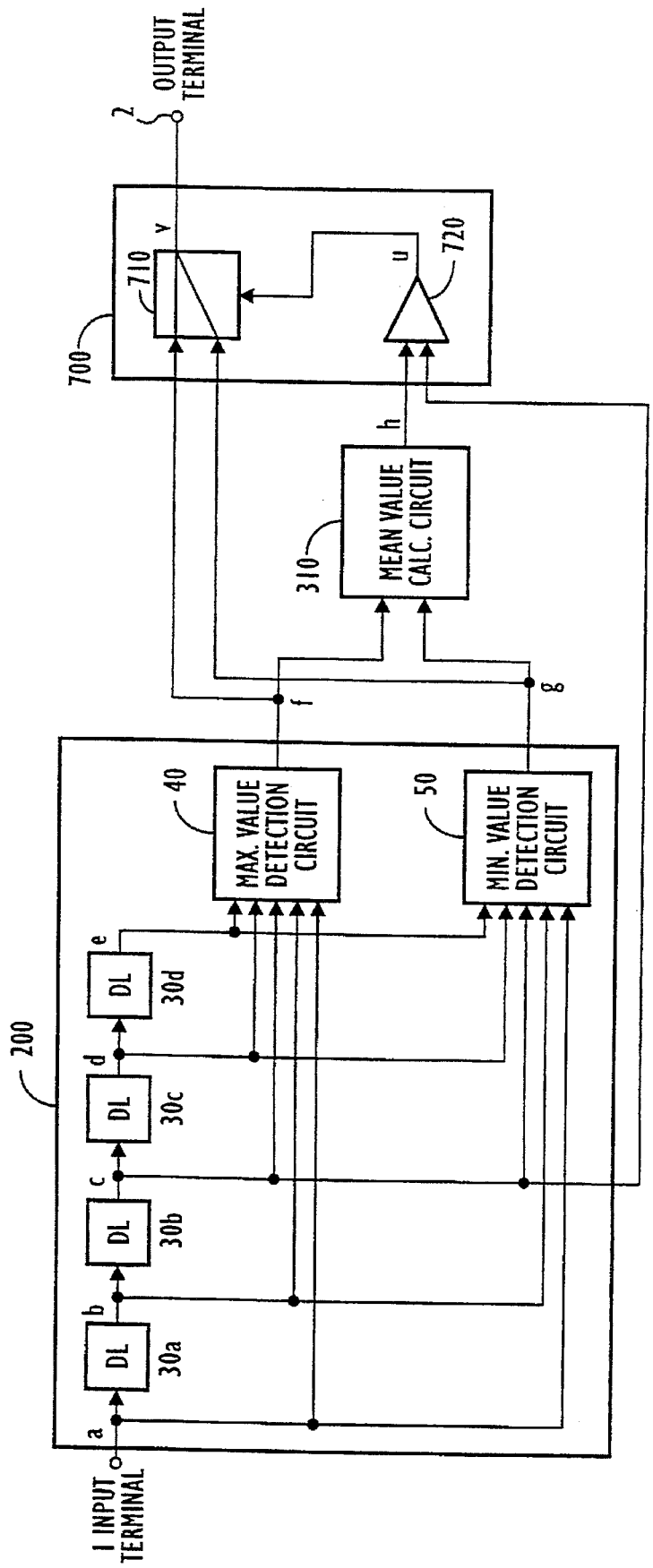
FIG. 32 shows a block diagram of the contour restoration apparatus according to the ninth preferred embodiment of the present invention.

FIG. 32 shows a block diagram of the contour restoration apparatus according to the ninth preferred embodiment of the present invention. In FIG. 32, a reference numeral 1 denotes an input terminal for video signals, 200 denote a signal level detection circuit, 310 denotes a mean value circuit, 700 denotes a switching circuit, and 2 denotes an output terminal. The signal level detection circuit 200 has the same composition as the signal level detection circuit 200 of the first embodiment shown in FIG. 1. The switching circuit 700 comprises a selector 710, and a comparator 720. In the contour restoration apparatus organized as above, a video signal applied to the input terminal 1 is input to the signal level detection circuit 200 and delayed by delay circuits 30a, 30b, 30c, and 30d. The input video signal and the output signals of the delay circuits 30a, 30b, 30c, and 30d are applied to the maximum valde detection circuit 40 and minimum value detection circuit 50. The output signals of the maximum value detection circuit 40 and minimum value detection circuit 50 are provided to the mean value circuit 310 and the selector 710 of the switching circuit 700. The output signal of the mean value circuit 310 and the output signal of the delay circuit 30b, ie. the signal at a point under consideration, are input to the comparator 720 of the switching circuit 700. In the switching circuit 700, the output signal of the comparator 720 is provided to the control terminal of the selector 710, and the output signal of the selector 710 is output through the output terminal 2 as the output signal of the switching circuit 700.

Figure 33:
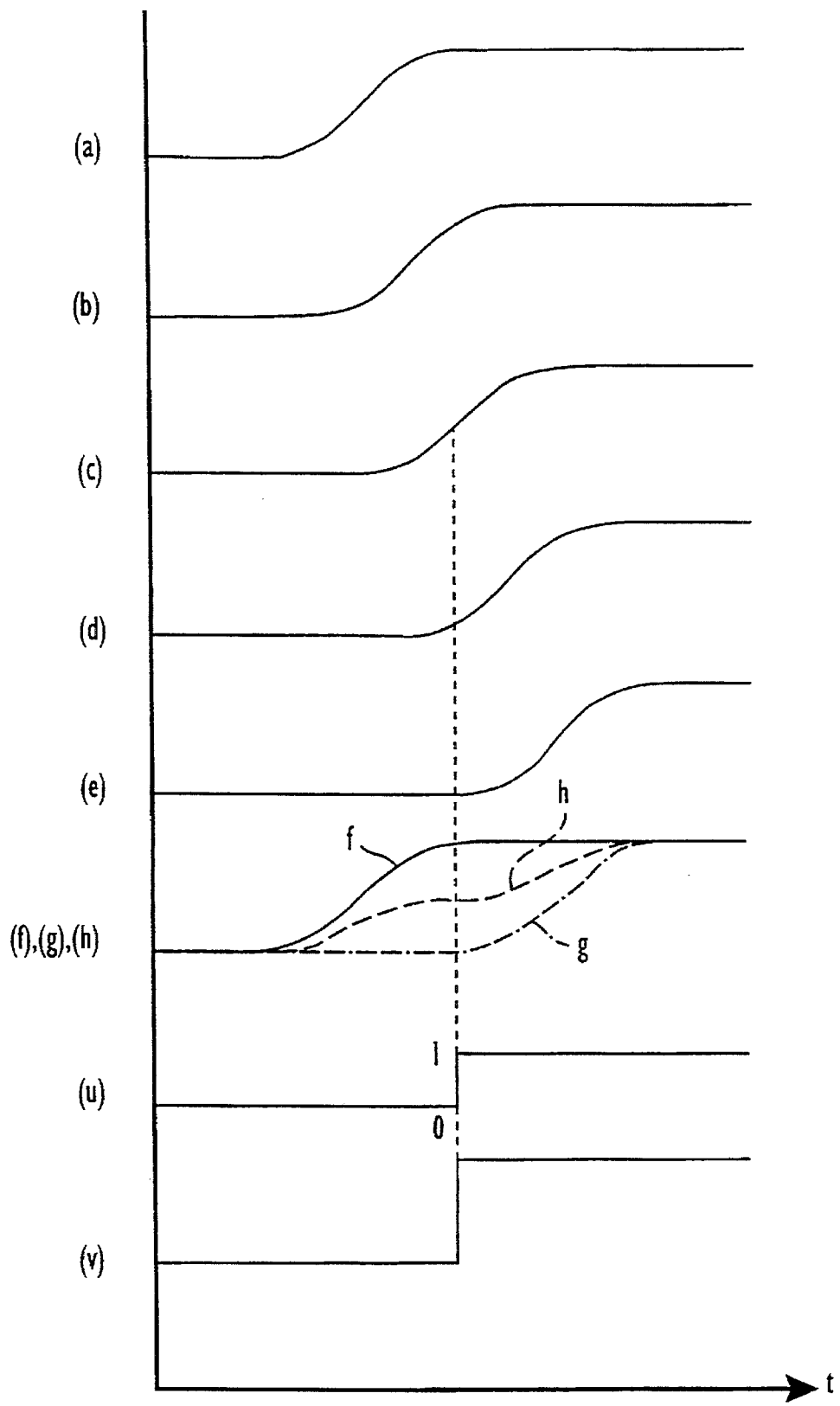
FIG. 33 shows waveforms of signals at respective points shown in FIG. 32.

The operation of the contour restoration apparatus organized as above is described below with reference to waveforms shown in FIG. 33. If, for example, a video signal shown in (a) of FIG. 33 is applied to the input terminal 1, then the signal is delayed by the delay circuits 30a, 30b, 30c, and 30d, and their output signals respectively become (b), (c), (d), and (e) of FIG. 32. The input video signal and the output signals of the delay circuits 30a, 30b, 30c, and 30d, ie. signals at points a, b, c, d, and e, are input to the maximum value detection circuit 40 and the minimum value detection circuit 50, where the maximum value (f), and the minimum values (g) input are detected. The maximum value and minimum value are input to the mean value circuit 310, which outputs the mean value (h) of FIG. 33. In the switching circuit 700, the comparator 720 compares each level of the output signal of the mean value circuit 310 with the corresponding level of the output signal of the delay circuit 30b, and the selector 710 selects either one of the corresponding maximum value and minimum value depending on the control signal output from the comparator 720. For example, value 1 is output by the comparator 720, if a level of the output signal of the delay circuit 30b is greater than the corresponding level of the output signal of the mean value circuit 310; otherwise value 0 is output. Then the output control signal of the comparator 720 becomes as shown in (u) of FIG. 33. If a value of the control signal is 1, then the corresponding maximum value is selected by the selector 710; otherwise the corresponding minimum value is selected. Therefore, the output signal of the selector 710 becomes a video signal having a restored contour as shown in (v) of FIG. 33 and is output through the output terminal 2 as the output signal of the switching circuit 700.

As described above, the ninth embodiment detects the maximum value, the minimum value, and the mean value of the amplitude of an input video signal and tests whether each amplitude level of a video signal at a point under consideration is greater than the corresponding mean value. If it is, then the corresponding maximum value is selected; otherwise the corresponding minimum value is selected. As a result, a video signal having restored contours are obtained. In this way, the present embodiment obtains a steep contour without adding undershoots or overshoots and performs contour restoration without producing unnatural black and white hems in contour parts.

Further, in the present embodiment, the mean value circuit 310 can be modified so that it reads the input video signal and the output signals of the delay circuits 301, 30b, 30c, and 30d instead of the output signals of the maximum value detection circuit 40 and the minimum detection circuit 50 and outputs their mean value.

In the present embodiments of the first to ninth inventions, video signals at five points in the horizontal direction were extracted in detecting the maximum and minimum values. However, the video signals can be extracted in any predetermined direction, for example, in the vertical or diagonal direction. Also, in detecting the maximum and minimum values, only parts of the extracted signals may be used in detecting the maximum and minimum values; for example, the signal level at every other point can be chosen.

Although the present inventions have been fully described in connection with the preferred embodiments thereof with reference to the accompanying drawings, it is to be noted that various changes and modifications are apparent to those skilled in the art. Such changes and modifications are to be understood as included within the scope of the present inventions as defined by the appended claims unless they depart therefrom.

What is claimed is:

1. A contour restoration apparatus comprising an input terminal for a string of video signals having been sampled with first sampling interval, a sampling rate converter for converting said string of video signals to a string of video signals having second sampling interval which is shorter than said first sampling interval, a plurality of delay circuits connected to said sampling rate converter in series, each of said plurality of delay circuits having a delay time determined in accordance with said second sampling interval a maximum value detection circuit for detecting a maximum value among output signal of said sampling rate converter and output signals of said plurality of delay circuits, a minimum value detection circuit for detecting a minimum value among signals same as those input to said maximum value detection circuit, a mean value circuit for calculating a mean value of output signals of said maximum and minimum value detection circuits, a subtraction means for subtracting said mean value from an output signal of selected one of said plurality of delay circuits, a gain controller for amplifying the output of said subtraction means with a predetermined gain, an adder for adding the output of said gain controller and said output signal of selected one of said plurality of delay circuits, and an output terminal for outputting the output of said adder as a contour restrated signal.

2. A contour restoration apparatus comprising an input terminal for video signals;

a plurality of delay circuits connected in series to said input terminal, each of said plurality of delay circuits having a predetermined delay time for a signal input thereto, a maximum value detection circuit for detecting a maximum value among input video signal and output signals of said plurality of delay circuits, a minimum value detection circuit for detecting a minimum value among signals same as those input to said maximum value detection circuit, a mean value circuit for calculating a mean value of output signals of said maximum and minimum value detection circuits, a comparator for comparing an output signal of selected one of said plurality of delay circuits with said mean value calculated by said mean value circuit, a selector for selecting either of said maximum value and minimum value in accordance with the output of said comparator, and an output terminal for outputting the output signal of said selector.

3. A contour restoration apparatus comprising:

an input terminal for video signals;

a plurality of delay circuits connected in series to said input terminal, each of said plurality of delay circuits having a predetermined delay time for a signal input thereto;

a maximum value detection circuit for detecting a maximum value among an input video signal and output signals of said plurality of delay circuits;

a minimum value detection circuit for detecting a minimum value among signals same as those input to said maximum value detection circuit;

a mean value circuit for calculating a mean value of output signals of said maximum and minimum value detection circuits;

a subtraction means for subtracting said mean value from a delayed signal output from one of said plurality of delay circuits, wherein said delayed signal has a delay time of one-half of a delay time obtained by a total of said plurality of said delay circuits;

a gain controller for amplifying the output of said subtraction means with a predetermined gain;

an adder for adding the output of said gain controller and said delayed signal input to said subtraction means;

a non-linear processing circuit to which the output of said adder and the maximum and minimum values output by said maximum and minimum detection circuits are input, said non-linear processing circuit outputting the maximum value if the output signal of said adder is larger than the maximum value, outputting the minimum value if the output signal of said adder is smaller than the minimum value, and outputting the output signal of said adder if the output signal of said adder is between the maximum value and the minimum value;

an output terminal for outputting the output of said non-linear processing circuit as a contour restored signal;

a location detection circuit for comparing an input video signal and output signals of said plurality of delay circuits with the maximum value detected by said maximum value detection value and comparing an input video signal and output signals of said plurality of delay circuits with the minimum value detection circuit; and said location detection circuit controlling the gain of the gain controller at zero if the maximum value and the minimum values are detected at the same side when seen from a location of the center signal among an input video signal and output signals of said plurality of delay circuits.

4. A contour restoration apparatus comprising:

an input terminal for video signals;

a plurality of delay circuits connected in series to said input terminal, each of said plurality of delay circuits having a predetermined delay time for a signal input thereto;

a maximum value detection circuit for detecting a maximum value among an input video signal and output signals of said plurality of delay circuits;

a minimum value detection circuit for detecting a minimum value among signals same as those input to said maximum value detection circuit;

a mean value circuit for calculating a mean value of output signals of said maximum and minimum value detection circuits;

a subtraction means for subtracting said mean value from a delayed signal output from one of said plurality of delay circuits, wherein said delayed signal has a delay time of one-half of a delay time obtained by a total of said plurality of said delay circuits;

a gain controller for amplifying the output of said subtraction means with a predetermined gain;

an adder for adding the output of said gain controller and said delayed signal input to said subtraction means;

a non-linear processing circuit to which the output of said adder and the maximum and minimum values output by said maximum and minimum detection circuits are input, said non-linear processing circuit outputting the maximum value if the output signal of said adder is larger than the maximum value, outputting the minimum value if the output signal of said adder is smaller than the minimum value, and outputting the output signal of said adder if the output signal of said adder is between the maximum value and the minimum value;

an output terminal for outputting the output of said non-linear processing circuit as a contour restored signal; and a contour amplitude detection circuit for detecting a difference between the maximum value and the minimum value detected by said maximum value detection circuit and minimum value detection circuit and controlling the gain of said gain controller according to said difference detected.

5. A contour restoration apparatus comprising:

an input terminal for video signals;

a plurality of delay circuits connected in series to said input terminal, each of said plurality of delay circuits having a predetermined delay time for a signal input thereto;

a maximum value detection circuit for detecting a maximum value among an input video signal and output signals of said plurality of delay circuits;

a minimum value detection circuit for detecting a minimum value among signals same as those input to said maximum value detection circuit;

a mean value circuit for calculating a mean value of output signals of said maximum and minimum value detection circuits;

a subtraction means for subtracting said mean value from a delayed signal output from one of said plurality of delay circuits, wherein said delayed signal has a delay time of one-half of a delay time obtained by a total of said plurality of said delay circuits;

a gain controller for amplifying the output of said subtraction means with a predetermined gain;

an adder for adding the output of said gain controller and said delayed signal input to said subtraction means;

a non-linear processing circuit to which the output of said adder and the maximum and minimum values output by said maximum and minimum detection circuits are input, said non-linear processing circuit outputting the maximum value if the output signal of said adder is larger than the maximum value, outputting the minimum value if the output signal of said adder is smaller than the minimum value, and outputting the output signal of said adder if the output signal of said adder is between the maximum value and the minimum value;

an output terminal for outputting the output of said non-linear processing circuit as a contour restored signal;

a contour extraction circuit to which a signal located centrally among an input video signal and output signals of said plurality of delay circuits and signals locating before and after the signal are input, said contour extraction circuit comprising multipliers for multiplying each of three signals input thereto with a predetermined coefficient and an adder for adding the three multiplied signals;

another gain controller for amplifying the output of said contour extraction circuit with a predetermined gain;

another adder for adding the output of said another gain controller and the centrally located signal;

a contour amplitude circuit for detecting a difference between the maximum value and the minimum value detected by said maximum value detection circuit and minimum value detection circuit and for outputting a coefficient determined according to the difference detected; and a mixer for mixing the output (1) of said non-linear processing circuit and the output (r) of said another adder according to an equation $$kn \times 1 + (1-kn) \times r$$

wherein kn is a coefficient given by said contour amplitude detection circuit.

* * * * *